(12) United States Patent
Hong et al.

(10) Patent No.: US 8,754,548 B2
(45) Date of Patent: Jun. 17, 2014

(54) RESONANCE POWER RECEIVING APPARATUS AND METHOD WITH WIRELESS POWER TRANSFORM FUNCTION, AND RESONANCE DEVICE

(75) Inventors: Young Tack Hong, Seongnam-si (KR); Nam Yun Kim, Seoul (KR); Sang Wook Kwon, Seongnam-si (KR); Eun Seok Park, Suwon-si (KR); Young Ho Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 567 days.

(21) Appl. No.: 13/079,113

(22) Filed: Apr. 4, 2011

(65) Prior Publication Data

US 2011/0248570 A1   Oct. 13, 2011

(30) Foreign Application Priority Data

Apr. 8, 2010   (KR) .................. 10-2010-0032138

(51) Int. Cl.
*H01F 27/42*   (2006.01)
(52) U.S. Cl.
USPC ............................................. 307/104

(58) Field of Classification Search
USPC ............................................. 307/104
See application file for complete search history.

(56) References Cited

U.S. PATENT DOCUMENTS

| 8,410,636 | B2 * | 4/2013 | Kurs et al. ............. 307/104 |
| 8,487,480 | B1 * | 7/2013 | Kesler et al. .......... 307/104 |
| 2012/0153893 | A1 * | 6/2012 | Schatz et al. ......... 320/108 |

FOREIGN PATENT DOCUMENTS

| JP | 10-174300 | 6/1998 |
| JP | 11-143600 | 5/1999 |
| JP | 2003-125545 | 4/2003 |
| JP | 2005-110412 | 4/2005 |
| JP | 2006-141170 | 6/2006 |
| JP | 2006-353094 | 12/2006 |

\* cited by examiner

*Primary Examiner* — Robert L. DeBeradinis
(74) *Attorney, Agent, or Firm* — NSIP Law

(57) ABSTRACT

Provided is a wireless power transmission system including a wireless power transmission function. The wireless power transmission system may be included in a set-up box and may include a source unit that transmits a resonance power to a resonance power receiving apparatus. A target resonance unit that receives the resonance power may be included in the resonance power receiving apparatus.

43 Claims, 24 Drawing Sheets

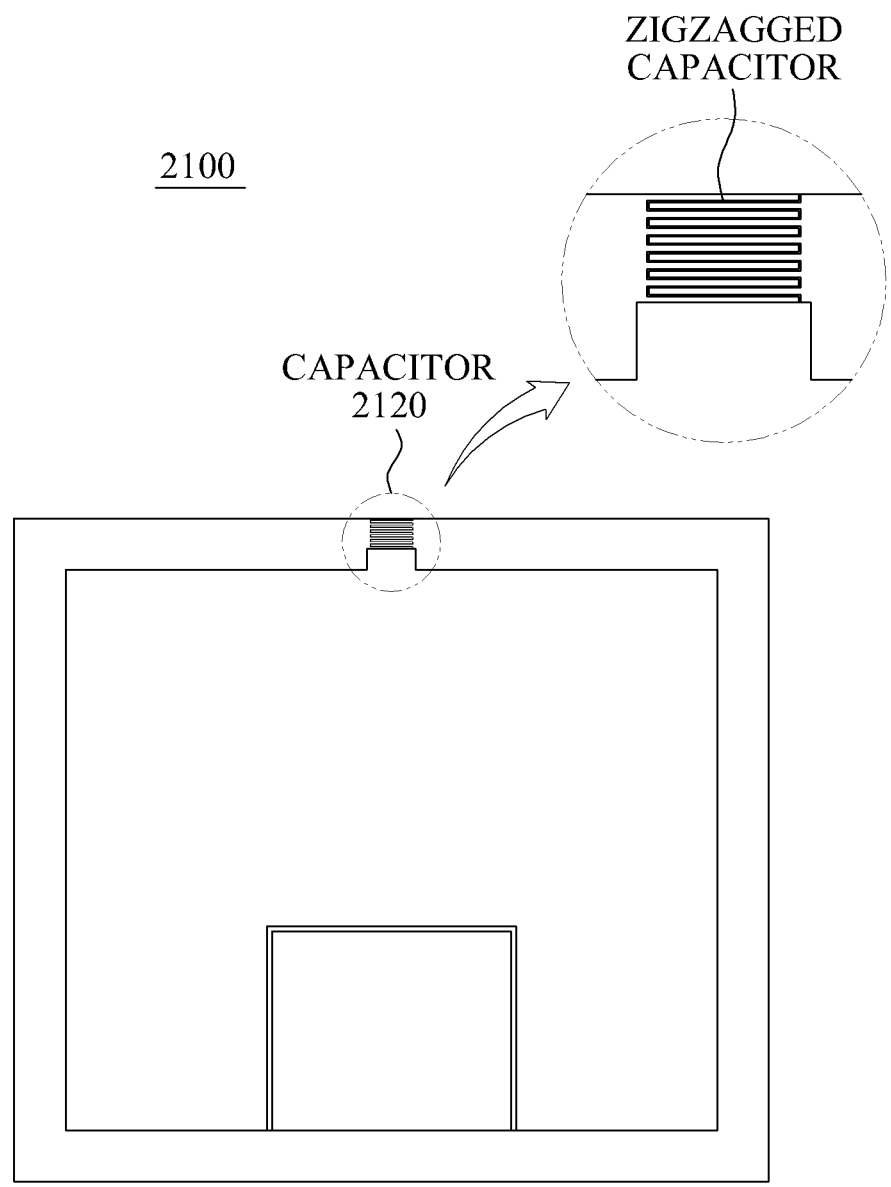

US 8,754,548 B2

RESONANCE POWER RECEIVING APPARATUS AND METHOD WITH WIRELESS POWER TRANSFORM FUNCTION, AND RESONANCE DEVICE

CROSS-REFERENCE TO RELATED APPLICATION(S)

This application claims the benefit under 35 U.S.C. §119(a) of Korean Patent Application No. 10-2010-0032138, filed on Apr. 8, 2010, in the Korean Intellectual Property Office, the entire disclosure of which is incorporated herein by reference for all purposes.

BACKGROUND

1. Field

The following description relates to a resonance power receiving apparatus, and particularly, to a resonance power receiving apparatus including a wireless power transmission function. In one example, the wireless power transmission may be transmission of a resonance power.

2. Description of Related Art

In general, a laptop computer system may be provided with power via various wired cables, such as a power cable and the like, or through a wireless charged battery. Recently, studies on wireless power transmission have been conducted to wirelessly provide power. Wireless power transmission technologies wirelessly transmit energy from a power source to electronic devices. Wireless energy transfer or wireless power is the transmission of electrical energy from a power source to an electrical load without interconnecting wires.

SUMMARY

In one general aspect, there is provided a wireless power transmission system, the system including: a set-up box including a source resonance unit configured to transmit a resonance power to a resonance power receiving apparatus, the resonance power receiving apparatus, including a target resonance unit configured to receive the resonance power, and a shielding unit configured to focus, on the target resonance unit, a magnetic field emitted in an omni-direction by the source resonance unit.

In the system, the source resonance unit may be included in a top of the set-up box, the source resonance unit including a source resonator and a shielding film configured to prevent current offsetting between the source resonator and a substrate.

In the system, the source resonance unit may include: a transmission line unit including multiple transmission line sheets arranged in parallel, and a capacitor configured to be inserted in a predetermined location of the transmission line unit.

In the system, the target resonance unit may be included in a bottom of the resonance power receiving apparatus, the target resonance unit configured to operate with a same resonance frequency as the source resonance unit.

In the system, the target resonance unit may include: a transmission line unit including multiple transmission line sheets arranged in parallel, and a capacitor configured to be inserted in a predetermined location of the transmission line unit.

In the system, the shielding unit may include: a metal housing, and a near-field focusing unit included in the metal housing, the near-field focusing unit including a high impedance surface (HIS).

In the system, the near-field focusing unit may be configured to enable a magnetic field of the source resonance unit to be in-phase.

In the system, the source resonance unit may be further configured to transmit the resonance power, based on a resonance frequency in a band of 2 MHz to 20 MHz.

In the system, the source resonance unit and the target resonance unit may be further configured to: perform communication, based on a frequency in a band of 2 MHz to 20 MHz, and perform transmission and reception of data at less than or equal to 1 Mbps.

In the system, the source resonance unit and the target resonance unit may be further configured to transmit and receive data to: authenticate an ID of the resonance power receiving apparatus, and check a charge level.

In the system: the source resonance unit may be further configured to sense multiple resonance power receiving apparatuses to be charged, and each of the multiple resonance power receiving apparatuses to be charged may be further configured to receive the resonance power from the source resonance unit through magnetic-coupling.

In the system, the resonance power receiving apparatus may comprise a laptop computer.

In another general aspect, there is provided a method for a wireless power transmission system, the method including: transmitting, by a source resonance unit in a set-up box, a resonance power to a resonance power receiving apparatus, receiving, by a target resonance unit in the resonance power receiving apparatus, the resonance power, and focusing on the target resonance unit, by a shielding unit, a magnetic field emitted in an omni-direction by the source resonance unit.

The method may further include: preventing, by the source resonance unit including a source resonator and a shielding film, current offsetting between the source resonator and a substrate, wherein the source resonance unit is included in a top of the set-up box.

The method may further include: operating the target resonance unit with a same resonance frequency as the source resonance unit, wherein the target resonance unit is included in a bottom of the set-up box.

In the method, the shielding unit may include: a metal housing, and a near-field focusing unit included in the metal housing, the near-field focusing unit including a high impedance surface (HIS).

The method may further include enabling, by the near-field focusing unit, a magnetic field of the source resonance unit to be in-phase.

The method may further include transmitting the resonance power, by the source resonance unit, based on a resonance frequency in a band of 2 MHz to 20 MHz.

The method may further include: performing, by the source resonance unit and the target resonance unit, communication, based on a frequency in a band of 2 MHz to 20 MHz, and performing, by the source resonance unit and the target resonance unit, transmission and reception of data at less than or equal to 1 Mbps.

The method may further include: transmitting and receiving data, by the source resonance unit and the target resonance unit, to: authenticate an ID of the resonance power receiving apparatus, and check a charge level.

The method may further include: sensing, by the source resonance unit, multiple resonance power receiving apparatuses to be charged, and receiving, by each of the multiple resonance power receiving apparatuses to be charged, the resonance power from the source resonance unit through magnetic-coupling.

In the method, the resonance power receiving apparatus may comprise a laptop computer.

In another general aspect, there is provided a resonance device for a wireless power transmission system, the resonance device including: a transmission line including: a first signal conducting portion, a second signal conducting portion, and a ground conducting portion, a capacitor configured to be inserted in a predetermined location of the transmission line, first and second conductors respectively electrically connected to the a first and second signal conducting portions, and a matcher electrically connected to the ground conducting portion, the matcher including a third conductor.

In the resonance device, the transmission line unit may further include multiple transmission line sheets arranged in parallel.

The resonance device may further include a connector configured to receive or transmit a current.

In another general aspect, there is provided a wireless power unit, the wireless power unit comprising: resonance device comprising: a transmission line comprising: a first signal conducting portion; a second signal conducting portion; and a ground conducting portion; a capacitor configured to be inserted in a predetermined location of the transmission line; first and second conductors respectively electrically connected to the a first and second signal conducting portions; and a matcher electrically connected to the ground conducting portion, the matcher comprising a third conductor.

In the wireless power unit, the transmission line unit may further comprise multiple transmission line sheets arranged in parallel.

The wireless power unit may further comprise a connector configured to receive or transmit a current.

In the wireless power unit, the wireless power unit comprises one or more of: a cellular phone, a personal digital assistant (PDA), a digital camera, a portable game console, and an MP3 player, a portable/personal multimedia player (PMP), a handheld e book, a portable tablet and/or laptop computer, a global positioning system (GPS) navigation.

In another general aspect, there is provided a wireless power system, the system comprising: a set-up box comprising a source resonance unit configured to transmit a resonance power to a resonance power receiving apparatus; and a shielding unit configured to focus, on a target resonance unit, a magnetic field emitted in an omni-direction by the source resonance unit.

In the system, the source resonance unit may be included in a top of the set-up box, the source resonance unit comprising a source resonator and a shielding film configured to prevent current offsetting between the source resonator and a substrate.

In the system, the source resonance unit may comprise: a transmission line unit comprising multiple transmission line sheets arranged in parallel; and a capacitor configured to be inserted in a predetermined location of the transmission line unit.

In the system, the shielding unit may comprise: a metal housing; and a near-field focusing unit included in the metal housing, the near-field focusing unit comprising a high impedance surface (HIS).

In the system, the near-field focusing unit may be configured to enable a magnetic field of the source resonance unit to be in-phase.

In the system, the source resonance unit may be further configured to transmit the resonance power, based on a resonance frequency in a band of 2 MHz to 20 MHz.

In the system, the source resonance unit may be further configured to: perform communication, based on a frequency in a band of 2 MHz to 20 MHz; and perform transmission of data at less than or equal to 1 Mbps.

In the system, the source resonance unit may be further configured to transmit and receive data to: authenticate an ID of the resonance power receiving apparatus; and check a charge level.

In the system: the source resonance unit may be further configured to sense multiple resonance power receiving apparatuses to be charged; and resonance power is transmitted from the source resonance unit through magnetic-coupling.

In another general aspect, there is provided a wireless power system, the system comprising: the resonance power receiving apparatus, comprising a target resonance unit configured to receive a resonance power from a source resonance unit, wherein the target resonance unit is included in a bottom of the resonance power receiving apparatus, the target resonance unit configured to operate with a same resonance frequency as the source resonance unit.

In the system, the target resonance unit may comprise: a transmission line unit comprising multiple transmission line sheets arranged in parallel; and a capacitor configured to be inserted in a predetermined location of the transmission line unit.

In the system, the target resonance unit may be further configured to: perform communication, based on a frequency in a band of 2 MHz to 20 MHz; and perform transmission and reception of data at less than or equal to 1 Mbps.

In the system, the target resonance unit may be further configured to transmit and receive data to: authenticate an ID of the resonance power receiving apparatus; and check a charge level.

The system may further comprise: a plurality of resonance power receiving apparatuses to be charged, wherein each of the plurality of resonance power receiving apparatuses to be charged is further configured to receive the resonance power from the source resonance unit through magnetic-coupling.

Other features and aspects may be apparent from the following detailed description, the drawings, and the claims.

BRIEF DESCRIPTION OF THE DRAWINGS

FIGS. 16 through 22 are diagrams illustrating examples of a resonator.

Figure 1:
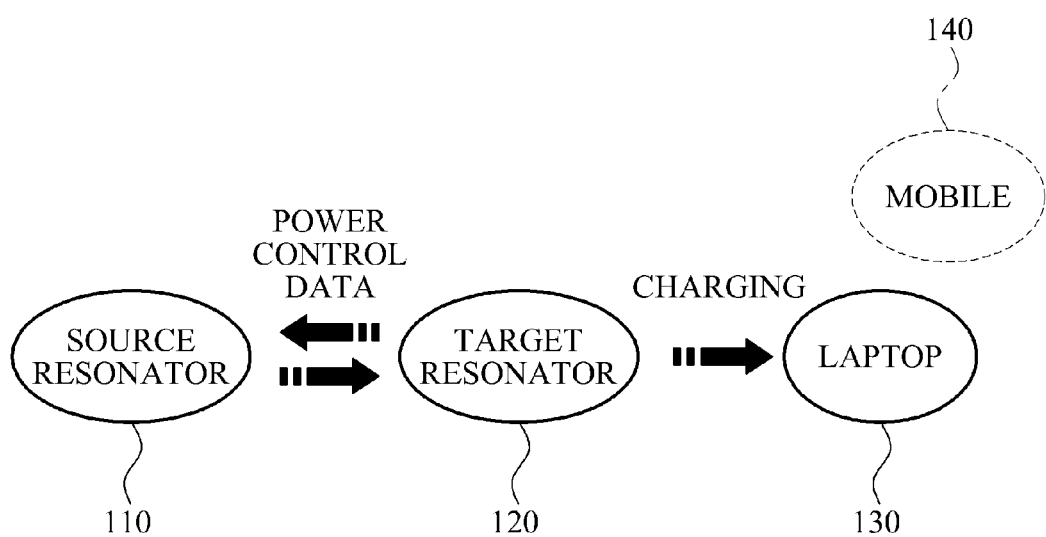
FIG. 1 is a diagram illustrating an example of a process of a laptop computer system performing resonance power transmission.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates an example of a process of a laptop computer system performing resonance power transmission.

Referring to FIG. 1, a source resonator 110 and a target resonator 120 may exist in an area in which energy coupling occurs. At least one target resonator 120 may exist. The source resonator 110 may generate a resonance power, and may wirelessly transmit the generated resonance power to the target resonator 120. The source resonator 110 may be included in a set-up box of a laptop computer system that is to be used for resonance power transmission. A laptop computer 130 or a mobile device 140 may be provided with power through the target resonator 120. Therefore, the target resonator 120 may be included in a laptop computer of the laptop computer system.

Figure 2:
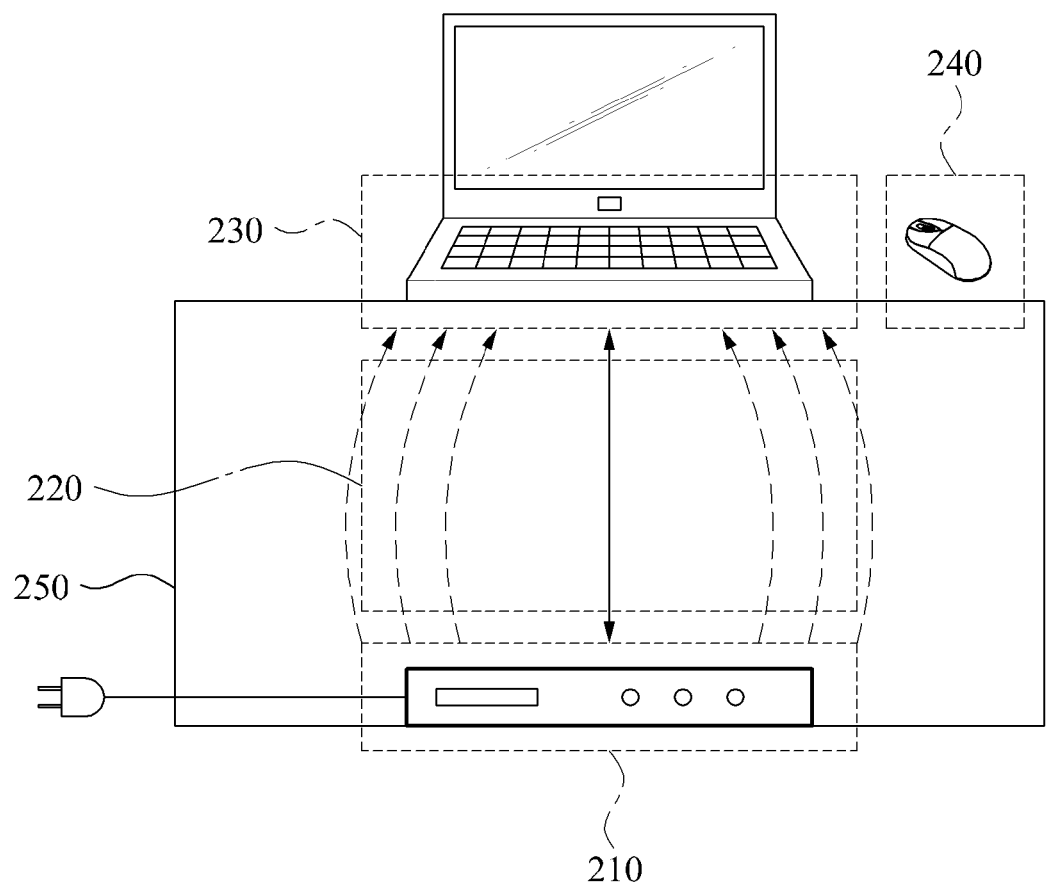
FIG. 2 is a diagram illustrating an example of a laptop computer system performing resonance power transmission.

FIG. 2 illustrates an example of a laptop computer system performing resonance power transmission.

Referring to FIG. 2, the laptop computer system may include a set-up box 210, a laptop computer 230, and a table 250.

Figure 3:
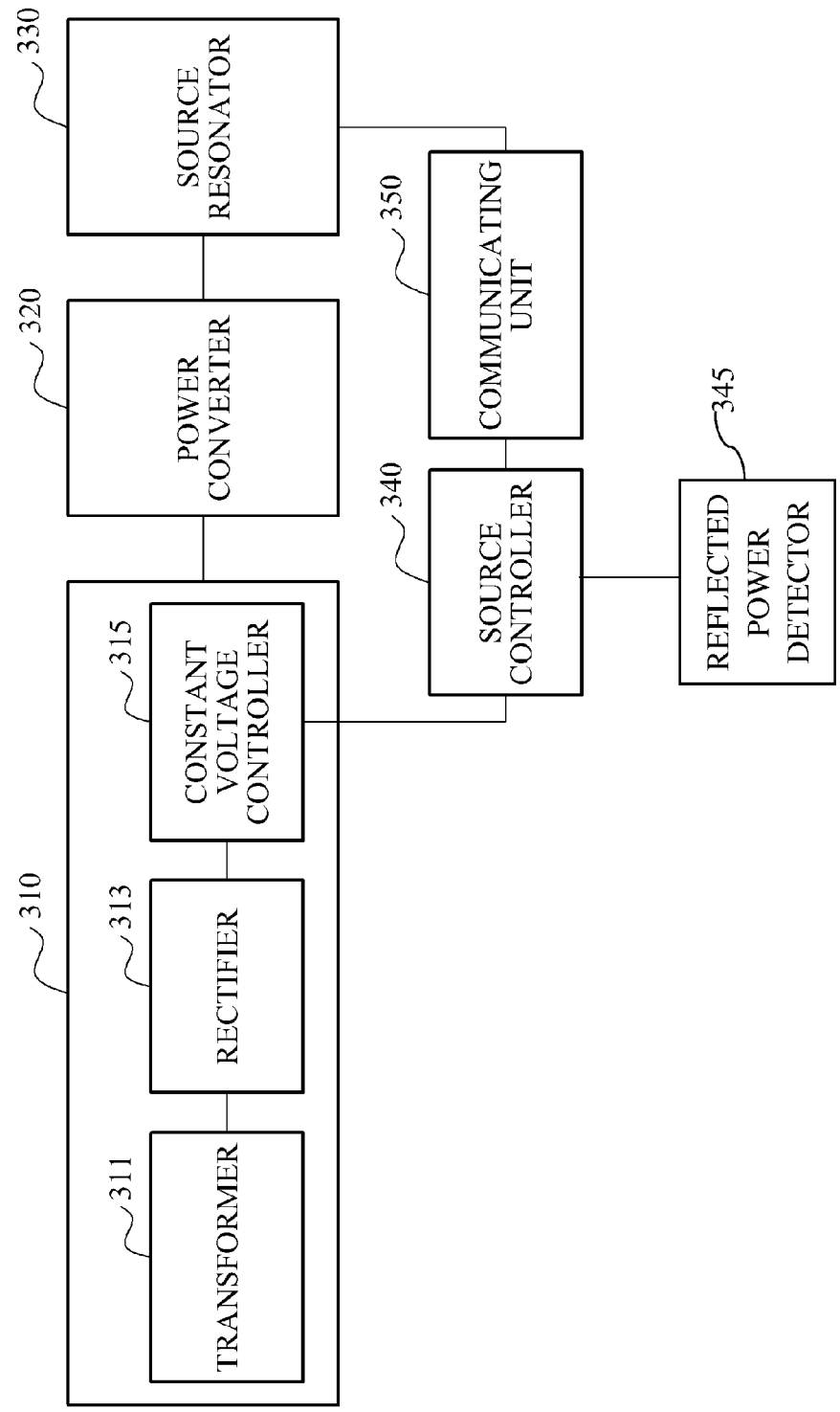
FIG. 3 is a diagram illustrating an example of a source resonance unit.

The set-up box 210 may include a source resonance unit. An example of the source resonance unit included in the set-up box 210 is illustrated in FIG. 3. The source resonance unit for the resonance power transmission may be included in the set-up box 210, and the source resonance unit may provide a resonance power to the laptop computer 230. The source resonance unit included in the set-up box 210 may be provided, e.g., with an AC voltage of 85 V through 265 V at, for example, 60 Hz, and may generate the resonance power based on the provided AC voltage. Other power sources may be used, for example, based on specific power transmission standards of various regions. The source resonance unit may be disposed in the top of the set-up box 210.

Figure 5:
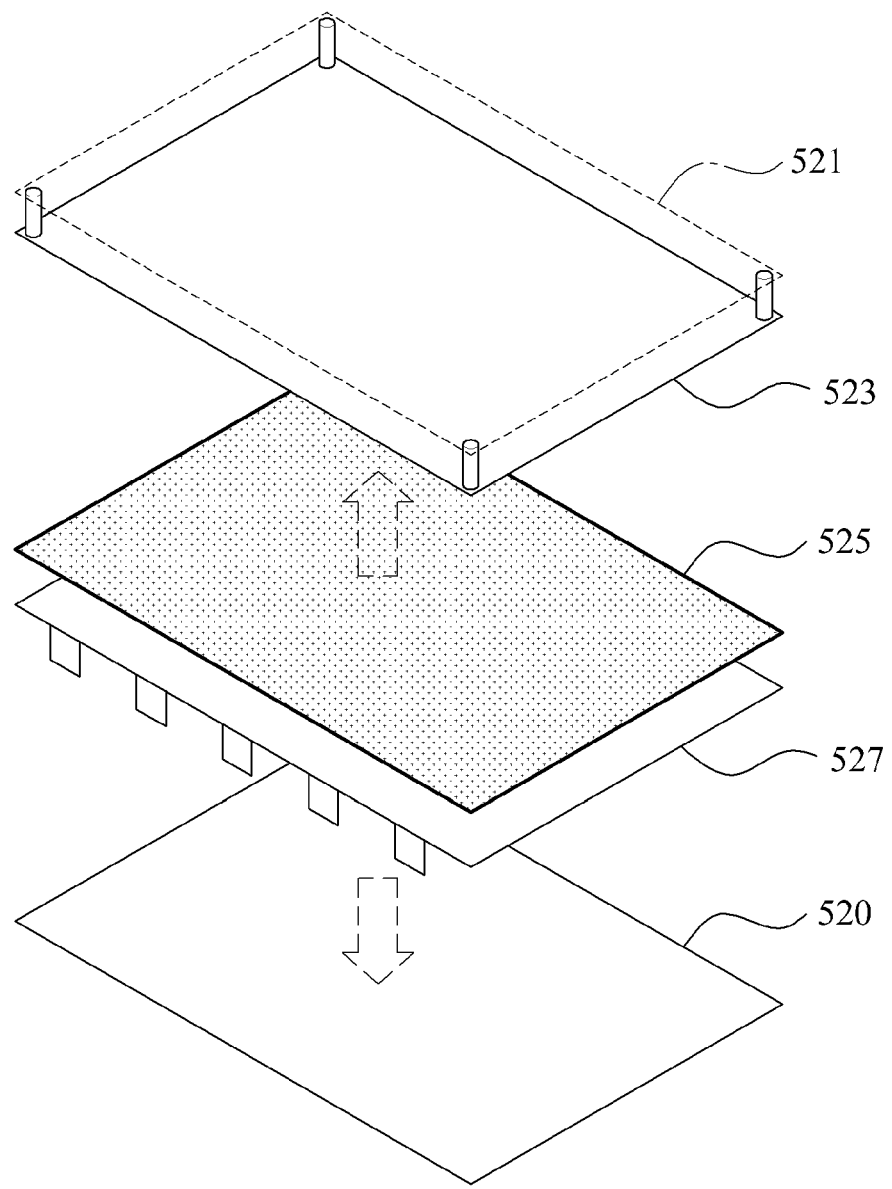
FIGS. 5 through 7 are diagrams illustrating examples of a target resonance unit of FIG. 4.

The laptop computer 230 may include a target resonance unit (e.g., FIG. 5). The target resonance unit for resonance power reception may be included in the laptop computer 230. The target resonance unit may be disposed in the bottom of the laptop computer 230. The laptop computer 230 may be located within a distance 220 in which the laptop computer 230 is able to perform energy-coupling with the source resonance unit of the set-up box 210.

The table 250 may include a shielding unit (e.g., the shielding unit 1210 of FIG. 14) to shield an external apparatus from electromagnetic waves when a resonance power is transmitted. The shielding unit may focus, e.g., on the target resonance unit, a magnetic field emitted by the source resonance unit in an omni-direction and thus, may prevent the external apparatus from being affected by the magnetic field. In response to a device 240, having the same resonance frequency as the source resonance unit, being located on the table 250, the device 240 may be wirelessly charged.

FIG. 3 illustrates an example of a source resonance unit 300.

Referring to FIG. 3, the source resonance unit 300 may include a voltage controller 310, a power converter 320, a source resonator 330, and a source controller 340. The source resonator 300 may further include a communicating unit 350 and a reflected power detector 345.

The voltage controller 310 may receive an AC signal of a first frequency and may output a DC voltage of a predetermined level. In one example, the first frequency may be in a band of a several dozens of Hz. The AC signal of the first frequency may be generated based on a high-speed switching scheme, e.g., using a high-speed switching device, or may be generated based on an oscillating scheme, e.g., using an oscillator. The voltage controller 310 may include a transformer 311, a rectifier 313, and a constant voltage controller 315.

The transformer 311 may adjust a signal level of an AC signal inputted from an external apparatus into a desired level.

The rectifier 313 may rectify an AC signal outputted from the transformer 311 and may output a DC signal.

The constant voltage controller 315 may output the DC voltage of the predetermined level based on controlling of the source controller 340. The constant voltage controller 315 may include a smoothing circuit to output the DC voltage of the predetermined level. The voltage level of the DC voltage outputted from the constant voltage controller 315 may be determined based on an amount of power to be used for a laptop computer or an amount of outputted resonance power.

The power converter 320 may convert the DC voltage of the predetermined level into an AC voltage based on a switching pulse signal in a second frequency band. Therefore, the power converter 320 may include an AC/DC inverter. In one example, the second frequency may be in a band of several MHz through several dozens of MHz. For example, the second frequency band may be a band of 2 MHz through 20 MHz. The AC/DC inverter may generate a resonance power by converting the DC signal outputted from the voltage controller 310 into an AC signal. The AC/DC inverter may convert, into the AC voltage, the DC voltage of the predetermined level that is outputted from the constant voltage controller 315, based on the switching pulse signal of the second frequency band. The AC/DC inverter may include a switching device for high-speed switching. In one example, the switching device may be configured to be turned on when the switching pulse signal is 'high' and to be turned off when the switching pulse signal is "low."

The source resonator 330 may transmit the resonance power to the laptop computer through magnetic-coupling.

The source controller 340 may control a signal level of the DC voltage outputted from the voltage controller 310, based on a reflected power and a number of resonance power receiving apparatuses. In one example, the resonance power receiving apparatus may be the laptop computer. In response to there being multiple laptop computers to be charged, the source controller 340 may control the signal level of the DC voltage outputted from the voltage controller 310 based on the number of the laptop computers to be charged.

In one example, the source controller 340 may control the signal level of the DC voltage outputted from the voltage controller 310, based on the number of the resonance power receiving apparatuses.

The source controller 340 may linearly control the signal level of the DC voltage outputted from the voltage controller 310, based on a distance between the resonance power receiving apparatus and the source resonator 330. In one example, a change in the distance between the resonance power receiving apparatus and the source resonator 330 may be detected based on an amount of reflected power. When the resonance power receiving apparatus moves away from the source resonance unit 300, the amount of the reflected power may increase. In response to the source controller 340 detecting an increase in the reflected power, the source controller 340 may increase the signal level of the DC voltage outputted from the voltage controller 310. The reflected power may indicate power of a reflected signal.

The source controller 340 may control the signal level of the DC voltage outputted from the voltage controller 310, based on a charge level of a load connected to the resonance power receiving apparatus.

In response to the amount of the reflected power increasing, the source controller 340 may decrease the signal level of the DC voltage outputted from the voltage controller 310, and when the amount of the reflected power decreases, the source controller 340 may increase the signal level of the DC voltage.

The source controller 340 may determine the number of resonance power receiving apparatuses based on a number of identifiers received from the resonance receiving apparatus. For example, in response to the resonance power reception beginning, the laptop computer may periodically transmit an identifier to the source resonance unit 300 to notify the source resonance unit 300 that the resonance power is being received. The source controller 340 may determine whether the number of resonance power receiving apparatuses is regular, based on whether the identifier is received. In one example, in response to the amount of reflected power being changed on a condition of the number of resonance power receiving apparatuses being regular or stable, the source controller 340 may linearly control the signal level of the DC voltage.

The reflected power detector may detect a reflected power of the resonance power transmitted to the resonance power receiving apparatus. The reflected power detector may detect a reflected signal through a coupler, and may calculate power of the detected reflected signal. In response to the reflected power being detected, the source controller 340 may determine that the number of the resonance power receiving apparatuses decreases or that the distance to the resonance power receiving apparatus is far. In response to an amount of the detected reflected power being greater than or equal to a predetermined value, the source controller 340 may determine that the charge level of the load connected to the resonance power receiving apparatus has changed. The source controller 340 may control the signal level of the DC voltage outputted from the voltage controller 310 based on the charge level of the load connected to the resonance power receiving apparatus. Therefore, the signal level of the DC voltage outputted from the voltage controller 310 may be adjusted based on whether the reflected power is detected.

The communicating unit 350 may receive the identifier of the resonance power receiving apparatus (e.g., the laptop computer), and may transmit the received identifier to the source controller 340. The communicating unit 350 may perform communication with a target resonance unit. Also, the communicating unit 350 may receive, from the target resonance unit, information associated with the amount of power to be used for the resonance power receiving apparatus (e.g., the laptop computer). The communicating unit 350 may perform communication using a frequency in a band of 2 MHz to 20 MHz. The communicating unit 350 may transmit and receive data at less than or equal to 1 Mbps and, thus, may perform communication without affecting power transmission. The source resonance unit 300 may authenticate an identification (ID) of the laptop computer or may control power to transmit power to be used for the laptop computer, using the included communicating unit 350.

Figure 4:
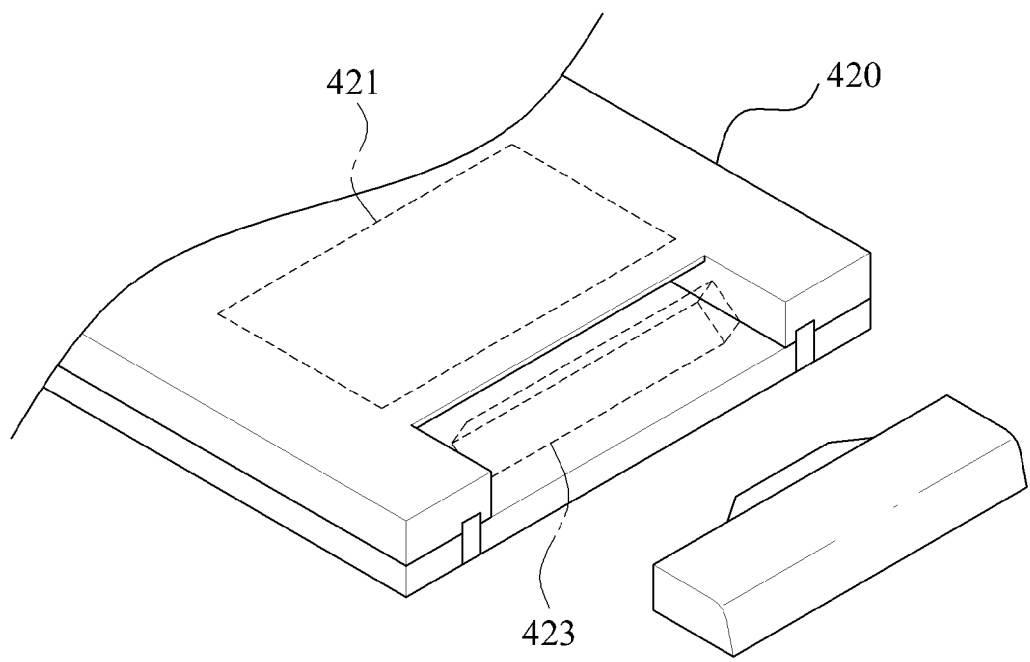
FIG. 4 is a diagram illustrating an example of a structure of a laptop computer.

FIG. 4 illustrates an example of a structure of a laptop computer 420.

Referring to FIG. 4, a target resonance unit may be included in a bottom 421 of the laptop computer 420, and a rectifying circuit may be included in a location 423 of the target resonance unit. In one example, the rectifying circuit may be a circuit that rectifies a received resonance power (e.g., AC power) to generate a DC power. Therefore, the rectifying circuit may be configured to include at least one diode, a resistance, a condenser, and a coil. Therefore, the rectifying circuit may include a smoothing circuit and may convert a high-frequency signal into a DC signal, based on the smoothing circuit.

Figure 6:
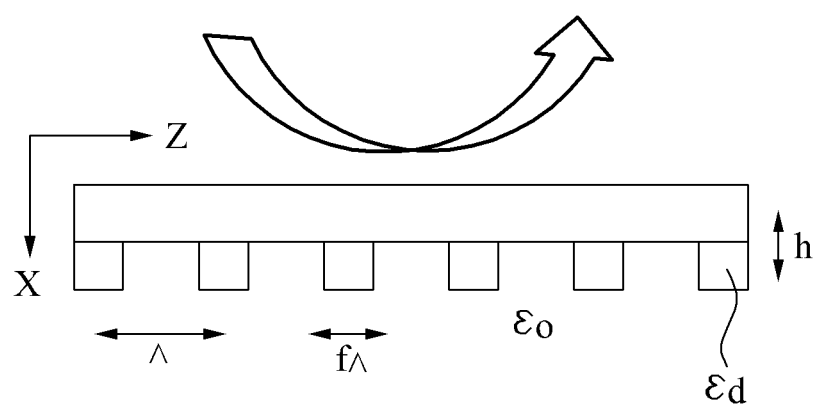
Figure 7:
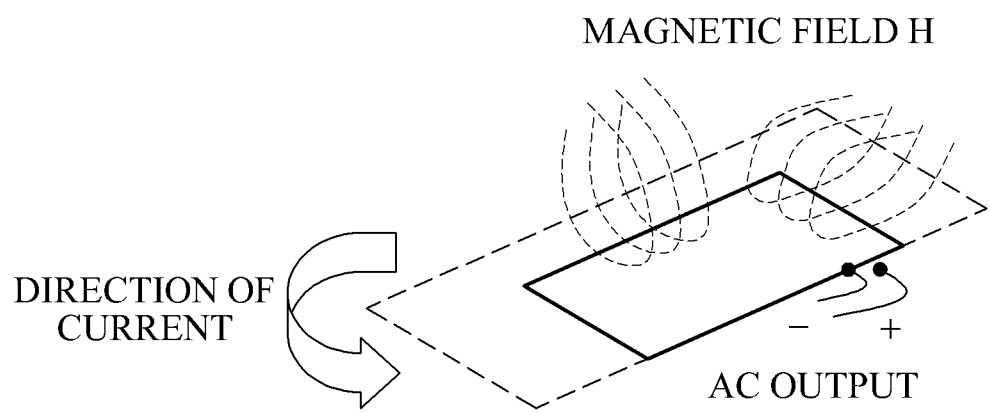

FIGS. 5 through 7 are diagrams illustrating examples of the target resonance unit of FIG. 4.

Referring to FIG. 5, the target resonance unit may include a target resonator 523, a substrate 527 included between the target resonator 523 and a bottom 520 of a laptop computer, and a shielding film 525.

The target resonator 523 may be configured to be fixed on the bottom 520 of the laptop computer by a case 521. The shielding film 525 may be made, e.g., from a material having a EMI/EMC shielding feature. Therefore, the shielding film 525 may prevent current offsetting between the target resonator 523 and the substrate 527.

The substrate 527 may include a dielectric grid in a surface, as illustrated in FIG. 6. In FIG. 6, "A" may denote an interval between each grid line of the dielectric grid and "h" may denote a height of a grid. In FIG. 6, "f" may denote a filling constant indicating a ratio of the grid in the interval of the dielectric grid. $\in_0$ may denote the interval and $\in_d$ may denote a relative permeability of the dielectric grid. A free space wavelength of a wave traveling from the left to the right may be $\lambda_0$, and may be in a form of a polarized light of a transverse magnetic (TM). A number of waves in the free space may be $k_0=2\pi/\lambda_0$. A resonance frequency may be determined based on the wave number of the free space. An AC power outputted from the resonator 523 may be generated by a magnetic field as illustrated in FIG. 7. A circuit configured to perform a function illustrated in FIG. 10 may be included in a predetermined location of the substrate 527. The structure of FIG. 5 may be applicable to a source resonance unit, e.g., the source resonance unit 300. The source resonance unit may include a source resonator and a shielding film to prevent the current offsetting between and the source resonator and a substrate.

Figure 8:
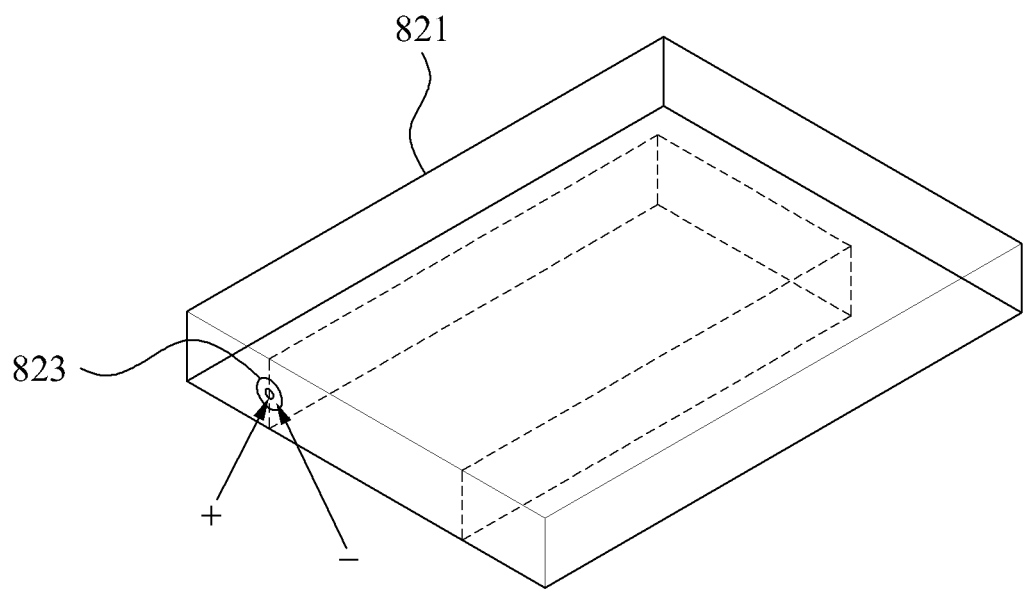
FIG. 8 is a diagram illustrating an example of a target resonance unit.

FIG. 8 illustrates an example of a target resonance unit.

Figure 9:
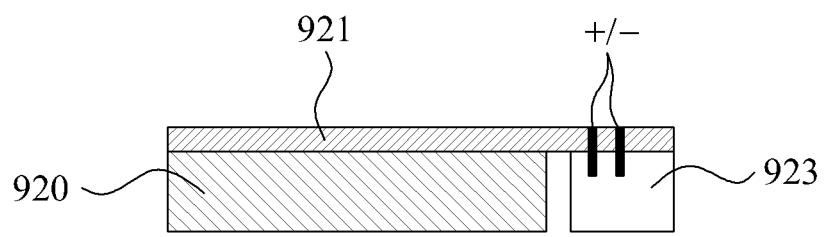
FIG. 9 is a side view illustrating an example of a laptop computer.

Referring to FIG. 8, the target resonator may include a target resonator 821 and an output port 823 to provide a current outputted from the target resonator 821 to a rectifying circuit (e.g., rectifying circuit 923 of FIG. 9).

FIG. 9 is a side view illustrating a laptop computer 920.

Referring to FIG. 9, a target resonance unit 921 may be included in a bottom of the laptop computer 920, and a target resonance unit 921 may access a rectifying circuit 923 through an output port (+/−). The target resonance unit 921 may include the rectifying circuit 923. The target resonance unit 921, including the rectifying circuit 923, is illustrated in FIG. 10.

Figure 10:
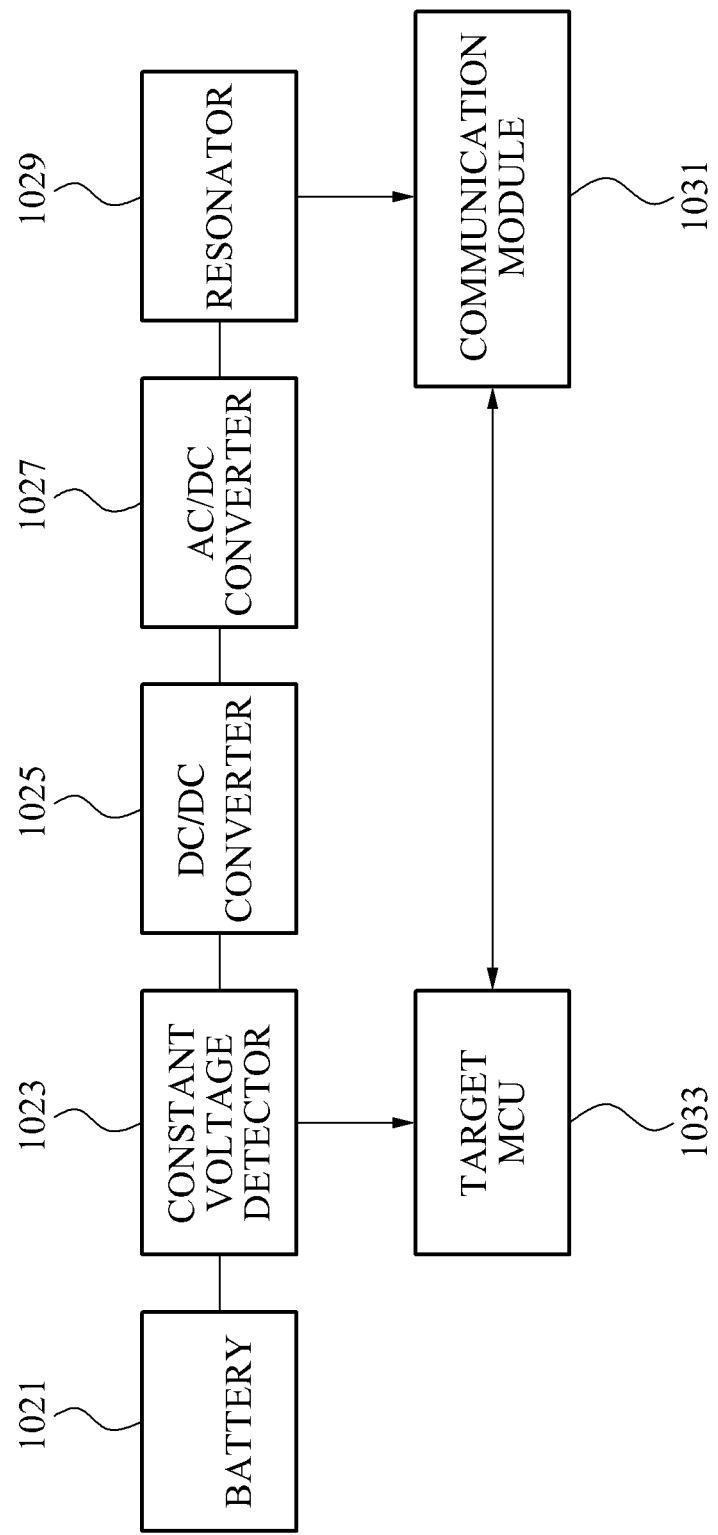
FIG. 10 is a diagram illustrating an example of the target resonance unit of FIG. 2.

FIG. 10 illustrates an example of the target resonance unit of FIG. 2.

Referring to FIG. 10, the target resonance unit may include a target resonator 1029, an AC/DC converter 1027, a DC/DC converter 1025, a constant voltage detector 1023, a battery 1021, and a target MCU 1033. The target resonance unit may further include a communication module 1031 that performs transmission and reception of data with a set-up box.

The resonator 1029 may receive a resonance power by operating using the same resonance frequency as the source resonator 330 of the source resonance unit 300.

The AC/DC converter 1027 may convert an AC signal received through the target resonator 1029 into a DC signal. Therefore, the AC/DC converter 1027 may include a rectifier.

The DC/DC converter 1025 may adjust a signal level of a DC signal to generate a rated voltage to be used for a laptop computer. The DC signal of which a level is adjusted by the DC/DC converter 1025 may be used for charging the battery 1021 or may be used for the laptop computer.

The constant voltage detector 1023 may detect a charge level of the battery 1021 in real-time, and may notify the target MCU 1033 of the detected charge level.

The target MCU 1033 may calculate a voltage or a current to be used, based on the charge level of the battery 1021, and may transmit the calculated values to the communication module 1031.

The communication module 1031 may modulate data received from the target MCU 1033, and may transmit the modulated data to the set-up box.

Figure 11:
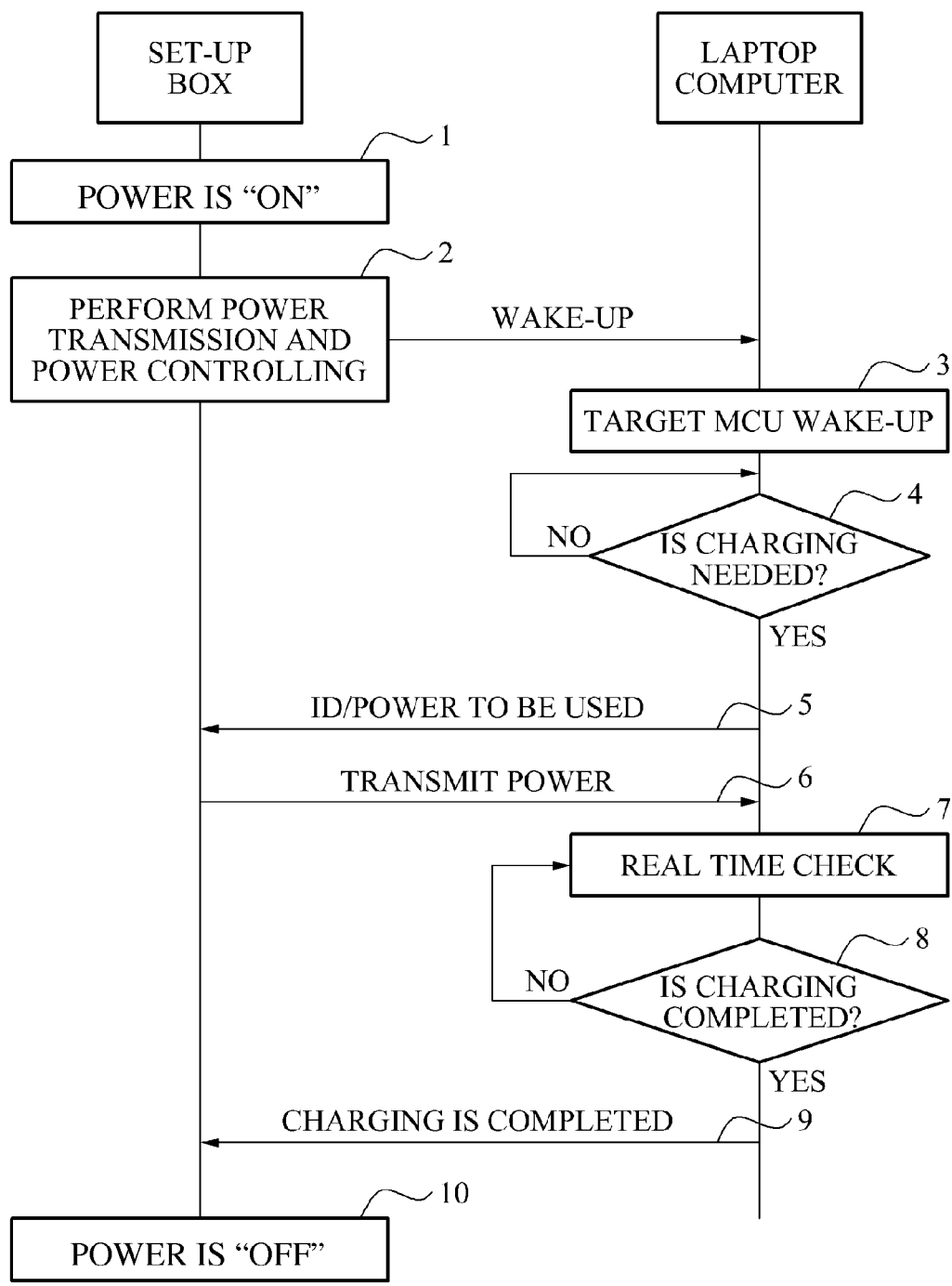
FIG. 11 is a diagram illustrating an example of operations of a laptop computer system.

FIG. 11 illustrates an example of operations of a laptop computer system.

Referring to FIG. 11, when a power button or power condition of a set-up box is "on" in operation 1, power transmission and power controlling may be performed in operation 2. The set-up box may transmit power to a target resonance unit, an amount of the power being the same as an amount of power to be used to wake up the target MCU 1033. The target MCU 1033 may wake up in operation 3. The term "wake up" may indicate a transition from a standby state to an active state. The target MCU 1033 may check a charge level of the battery 1021 to determine whether charging is needed in operation 4.

In response to the target MCU 1033 determining that the battery 1021 needs to be charged, the target MCU 1033 may control the communication module 1031 to transmit, to the set-up box, an ID of the laptop computer and information associated with power to be used for the laptop computer in operation 5. In one example, the ID of the laptop computer may be information to be used when a resonance power is transmitted to only an authenticated device.

In operation 6, the set-up box may transmit, to the laptop computer, power to be used for charging the battery 1021.

In response to the charging of the battery 1021 being started, the constant voltage detector 1023 may detect the charge level of the battery 1021 in real-time in operation 7. The target MCU 1033 may determine whether the charging is completed in operation 8, and the target MCU 1033 may notify the set-up box that the charging is completed in response to the charging being completed in operation 9.

In operation 10, the power button or condition of the set-up box may be "off" and wireless power transmission may be terminated.

Figure 12:
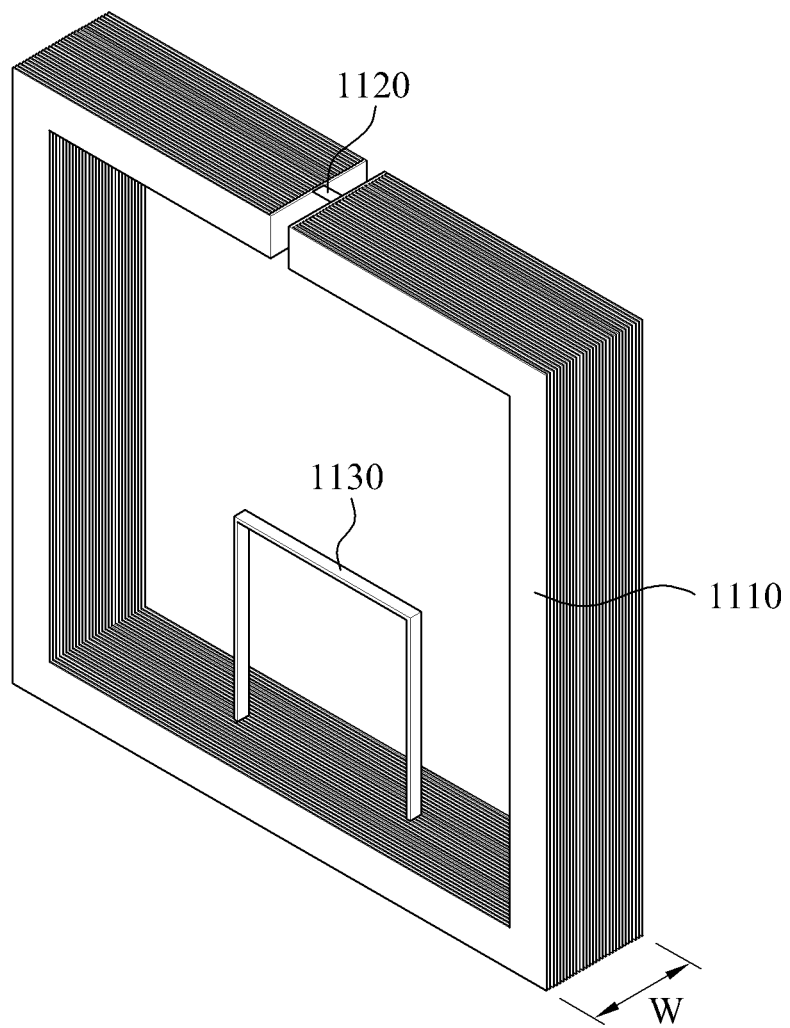
FIG. 12 is a diagram illustrating an example of a resonator.

FIG. 12 illustrates an example of a resonator.

The resonator of FIG. 12 may be applicable to a source resonator and a target resonator.

Referring to FIG. 12, the resonator may include a transmission line unit 1110 and a capacitor 1120. The resonator according to an embodiment may further include a matching unit 1130.

The transmission line unit 1110 may include multiple transmission line sheets arranged in parallel. The parallel arrangement of the multiple transmission line sheets will be described with reference to FIG. 12.

The capacitor 1120 may be inserted in a predetermined location of the transmission line unit 1110. In one example, the capacitor 1120 may be inserted in series in a center of the transmission line unit 110. In one example, an electric field generated in the resonator may be locked up in the capacitor 1120.

In response to a capacitance of the capacitor 1120 inserted as the lumped element being appropriately determined, the resonator 700 may have the characteristic of a metamaterial (described below). As the resonator may have a negative magnetic permeability by appropriately adjusting the capacitance of the capacitor 1120, the resonator may also be referred to as an MNG resonator The resonator, also referred to as the MNG resonator, may have a zeroth order resonance characteristic of having, as a resonance frequency, a frequency when a propagation constant is "0". As the resonator may have the zeroth order resonance characteristic, the resonance frequency may be independent with respect to a physical size of the MNG resonator. By appropriately designing the capacitor, the MNG resonator may sufficiently change the resonance frequency. Accordingly, the physical size of the MNG resonator may not be changed.

The matching unit 1130 may feed a current to the MNG resonator. In one example, the matching unit 1130, also referred to as a feeding unit, may be designed to regularly distribute a current provided to the resonator to the multiple transmission line sheets.

Figure 13:
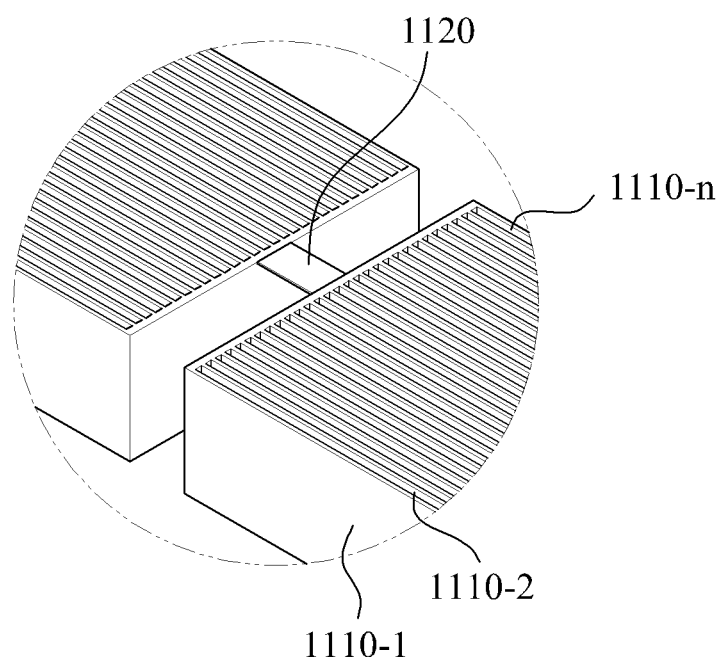
FIG. 13 is a diagram illustrating a location where a capacitor of FIG. 12 is inserted.

FIG. 13 illustrates a location where a capacitor 1120 of FIG. 12 is inserted.

Referring to FIG. 13, the capacitor 1120 may be inserted into a center-end portion of the transmission line 1110. In one example, the center-end portion of the transmission line unit 1110 may be an opened structure to enable the capacitor 1120 to be inserted, and transmission line sheets 1110-1 through 1110-*n* may be connected in parallel with each other.

Figure 14:
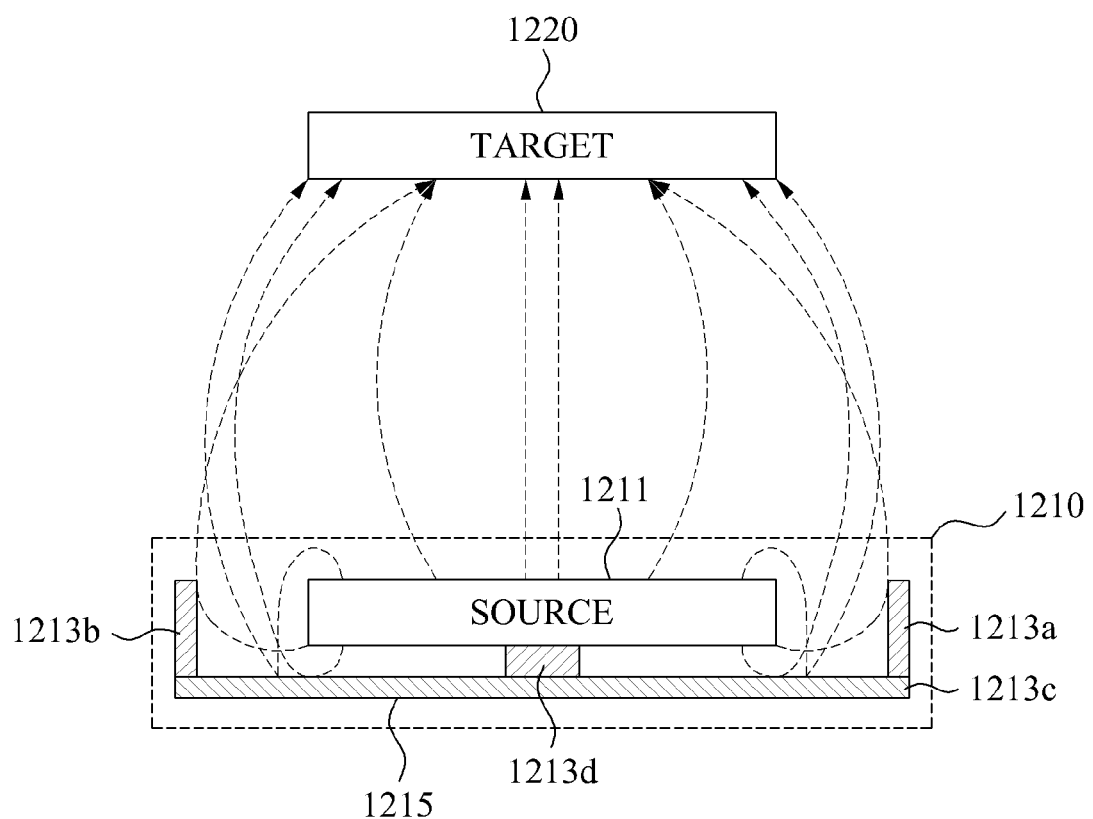
FIG. 14 is a diagram illustrating an example of a shielding unit.

FIG. 14 illustrates an example of a shielding unit.

The shielding unit 1210 may be included in a cabinet, and the cabinet may be shielded by a metal housing (not illustrated).

The shielding unit 1210 may include a near-field focusing unit 1215 that may be included in the metal housing and may be designed to include a high impedance surface (HIS) feature.

The near-field focusing unit 1215 may include side focusing units 1213*a* and 1213*b*, a rear focusing unit 1213*c*, and a supporting unit 1213*d*.

The side focusing units 1213*a* and 1213*b* may control a direction of a side magnetic field (e.g., directions of side magnetic fields of the source unit 1211) to focus the side magnetic fields on the target source unit 1220. In one example, the source unit 1211 may denote a source resonator or a set-up box.

The rear focusing unit 1213c may control a direction of a rear magnetic field of the source unit 1211 to focus the rear magnetic field on the target source unit 1220.

The near-field focusing unit 1215 may be designed to have an HIS feature. Therefore, the near-field focusing unit 1215 may minimize a change in a Q-factor or a resonance frequency of a power resonator by minimizing a ground effect.

In one example, the HIS may be designed based on the resonance frequency of the source unit 1211. The near-field focusing unit 1215 may be designed to enable the magnetic field of the source unit 1211 to be in-phase. In response to the near-field focusing unit 1215 having the HIS feature, the magnetic field generated from the source unit 1211 may be in-phase with respect to the near-field focusing unit 1215.

Figure 15:
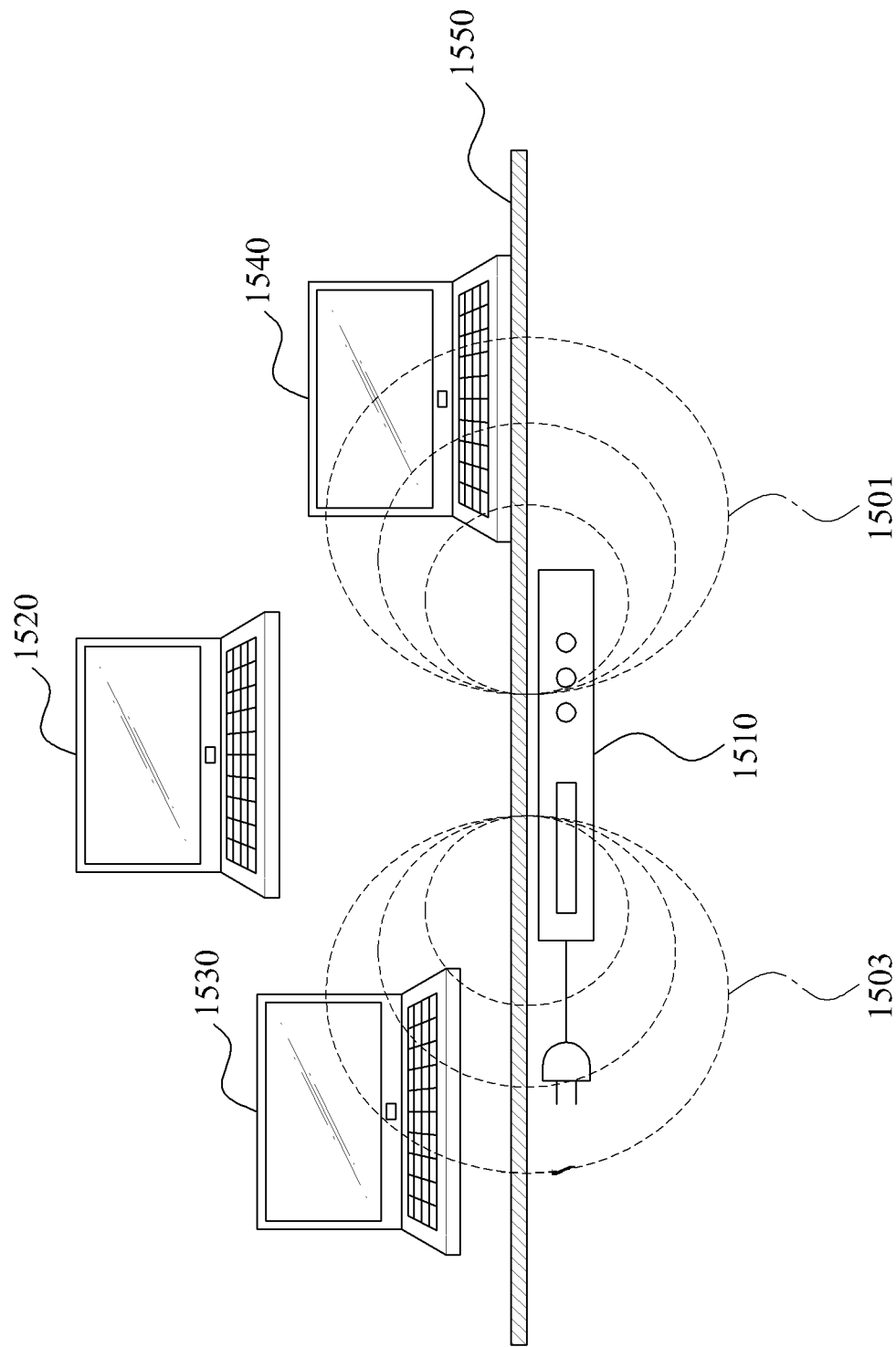
FIG. 15 is a diagram illustrating another example of a laptop computer system performing wireless power transmission.

FIG. 15 illustrates another example of a laptop computer system performing resonance power transmission.

A set-up box 1510 of FIG. 15 may perform the same function as the set-up box 210 of FIG. 2. The set-up box 1510 may include a source resonance unit (see FIG. 3). In one example, the source resonance unit included in the set-up box 1510 may detect multiple laptop computers 1520, 1530, and 1540 to be charged. Each of the multiple laptop computers 1520, 1530, and 1540 to be charged may receive a resonance power from the source resonance unit through magnetic coupling, such as magnetic coupling 1501 or magnetic coupling 1503.

A pad 1550 of FIG. 15 may denote a pad that performs the same function as the table 250 of FIG. 2. In response to each of the multiple laptop computers 1520, 1530, and 1540 being placed on the pad 1550, an 1:N magnetic coupling with the source resonance unit may be formed. In response to the 1:N magnetic coupling being formed, the source resonance unit may generate the resonance power, e.g., of 85-265 V AC, based on a demand power of each of the multiple laptop computers 1520, 1530, and 1540 to be charged. The pad 1550 may be made out of a material having an EMI/EMC shielding feature.

The example embodiment of FIG. 2 and the example embodiment of FIG. 15 may be distinguished in terms of scheme. The example embodiment of FIG. 2 is based on a non-access based resonance power transmission and reception scheme, and the example embodiment of FIG. 15 is based on an access-pad based resonance power transmission and reception scheme. Users may select one of the non-access based resonance power transmission and reception scheme and the access-pad based resonance power transmission and reception scheme, based on an environment in which the laptop computer system is to be installed.

According to example embodiments, power may be provided to a laptop computer, and the like, without using a separate cable. Various devices and mobile devices having the same resonance frequency as a source resonance unit may be wirelessly charged. When the laptop computer is used as a repeater, multiple devices may be charged. For example, a laptop computer, mobile telephone, wireless keyboard, wireless mouse, and personal digital assistant (PDA) may be charged at the same time without separate charging cables.

A source resonator and/or a target resonator may be configured as a helix coil structured resonator, a spiral coil structured resonator, a meta-structured resonator, and the like.

Hereinafter, related terms will be described for convenience of description. All the materials may have a unique magnetic permeability, that is, Mu ($\mu$); and a unique permittivity, that is, epsilon ($\in$). The magnetic permeability indicates a ratio between a magnetic flux density occurring with respect to a given magnetic field in a corresponding material and a magnetic flux density occurring with respect to the given magnetic field in a vacuum state. The magnetic permeability and the permittivity may determine a propagation constant of a corresponding material in a given frequency or a given wavelength. An electromagnetic characteristic of the corresponding material may be determined based on the magnetic permeability and the permittivity. For example, a material having a magnetic permeability or a permittivity not found in nature and being artificially designed is referred to as a metamaterial. The metamaterial may be easily disposed in a resonance state even in a relatively large wavelength area or a relatively low frequency area. For example, even though a material size rarely varies, the metamaterial may be easily disposed in the resonance state.

Figure 16:
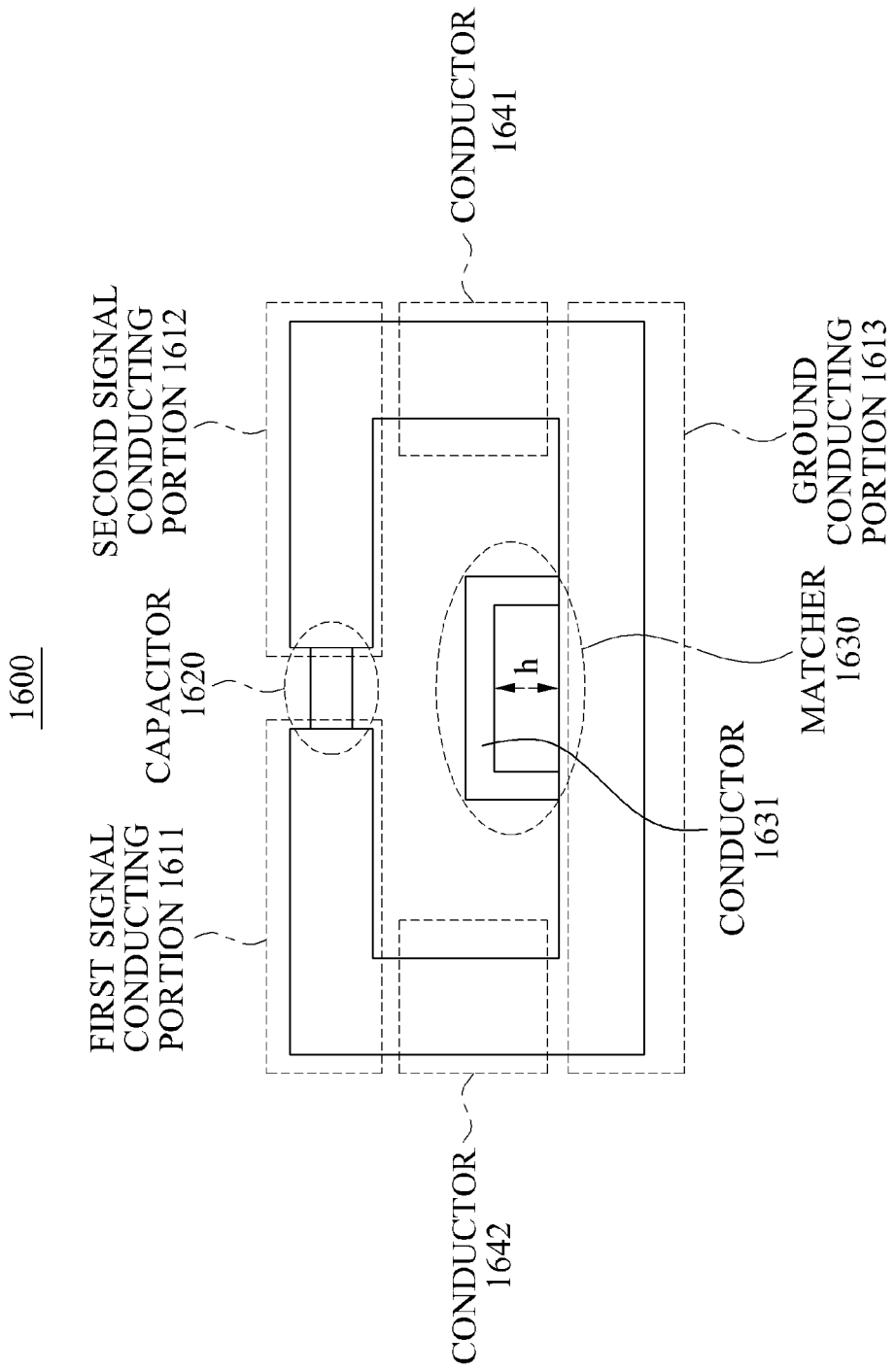

FIG. 16 illustrates an example of a resonator 1600 having a two-dimensional (2D) structure.

Referring to FIG. 16, the resonator 1600 having the 2D structure may include a transmission line, a capacitor 1620, a matcher 1630, and conductors 1641 and 1642. The transmission line may include a first signal conducting portion 1611, a second signal conducting portion 1612, and a ground conducting portion 1613.

The capacitor 1620 may be inserted in series between the first signal conducting portion 1611 and the second signal conducting portion 1612, such that an electric field may be confined within the capacitor 1620. In one example, the transmission line may include at least one conductor in an upper portion of the transmission line, and may also include at least one conductor in a lower portion of the transmission line. A current may flow through the at least one conductor disposed in the upper portion of the transmission line and the at least one conductor disposed in the lower portion of the transmission line may be electrically grounded. A conductor disposed in an upper portion of the transmission line may be separated into and may be referred to as the "first signal conducting portion" 1611 and the "second signal conducting portion" 1612. A conductor disposed in the lower portion of the transmission line may be referred to as the "ground conducting portion" 1613.

As shown in FIG. 16, the resonator 1600 may have the 2D structure. The transmission line may include the first signal conducting portion 1611 and the second signal conducting portion 1612 in the upper portion of the transmission line, and may include the ground conducting portion 1613 in the lower portion of the transmission line. The first signal conducting portion 1611 and the second signal conducting portion 1612 may be disposed to face the ground conducting portion 1613. The current may flow through the first signal conducting portion 1611 and the second signal conducting portion 1612.

One end of the first signal conducting portion 1611 may be shorted (e.g., connected) to the conductor 1642, and another end of the first signal conducting portion 1611 may be connected to the capacitor 1620. One end of the second signal conducting portion 1612 may be grounded (e.g., connected) to the conductor 1641, and another end of the second signal conducting portion 1612 may be connected to the capacitor 1620. Accordingly, the first signal conducting portion 1611, the second signal conducting portion 1612, the ground conducting portion 1613, and the conductors 1641 and 1642 may be connected to each other, such that the resonator 1600 may have an electrically closed-loop structure. The term "loop structure" may include a polygonal structure, for example, a circular structure, a rectangular structure, and the like. "Having a loop structure" may indicate being electrically closed.

The capacitor 1620 may be inserted into an intermediate portion of the transmission line. For example, the capacitor 1620 may be inserted into a space between the first signal conducting portion 1611 and the second signal conducting portion 1612. The capacitor 1620 may have a shape, e.g., of a lumped element, a distributed element, and the like. As an example, a distributed capacitor having the shape of the distributed element may include zigzagged conductor lines and a dielectric material having a relatively high permittivity between the zigzagged conductor lines.

When the capacitor 1620 is inserted into the transmission line, the resonator 1600 may have a property of a metamaterial. As discussed above, the metamaterial indicates a material having a predetermined electrical property that cannot be discovered in nature and thus, may have an artificially designed structure. An electromagnetic characteristic of all the materials existing in nature may have a unique magnetic permeability or a unique permittivity. Most materials may have a positive magnetic permeability or a positive permittivity. In the case of most materials, a right hand rule may be applied to an electric field, a magnetic field, and a pointing vector and thus, the corresponding materials may be referred to as right handed materials (RHMs). However, a metamaterial has a magnetic permeability or a permittivity absent in nature and thus, may be classified into an epsilon negative (ENG) material, a mu negative (MNG) material, a double negative (DNG) material, a negative refractive index (NRI) material, a left-handed material (LHM), and the like, based on a sign of the corresponding permittivity or magnetic permeability.

When a capacitance of the capacitor inserted as the lumped element is appropriately determined, the resonator 1600 may have the characteristic of the metamaterial. As the resonator 1600 may have a negative magnetic permeability by appropriately adjusting the capacitance of the capacitor 1620, the resonator 1600 may also be referred to as an MNG resonator. Various criteria may be applied to determine the capacitance of the capacitor 1620. For example, the various criteria may include a criterion for enabling the resonator 1600 to have the characteristic of the metamaterial, a criterion for enabling the resonator 1600 to have a negative magnetic permeability in a target frequency, a criterion for enabling the resonator 1600 to have a zeroth order resonance characteristic in the target frequency, and the like. Based on at least one criterion among the aforementioned criteria, the capacitance of the capacitor 1620 may be determined.

The resonator 1600, also referred to as the MNG resonator 1600, may have a zeroth order resonance characteristic of having, as a resonance frequency, a frequency when a propagation constant is "0". As the resonator 1600 may have the zeroth order resonance characteristic, the resonance frequency may be independent with respect to a physical size of the MNG resonator 1600. By appropriately designing the capacitor 1620, the MNG resonator 1600 may sufficiently change the resonance frequency. Accordingly, the physical size of the MNG resonator 1600 may not be changed.

In a near field, the electric field may be concentrated on the capacitor 1620 inserted into the transmission line. Accordingly, due to the capacitor 1620, the magnetic field may become dominant in the near field. The MNG resonator 1600 may have a relatively high Q-factor using the capacitor 1620 of the lumped element. As such, it may be possible to enhance an efficiency of power transmission. For example, the Q-factor may indicate a level of an ohmic loss or a ratio of a reactance with respect to a resistance in the wireless power transmission. It may be understood that the efficiency of the wireless power transmission may increase according to an increase in the Q-factor.

The MNG resonator 1600 may include the matcher 1630 for impedance matching. The matcher 1630 may appropriately adjust a strength of a magnetic field of the MNG resonator 1600. An impedance of the MNG resonator 1600 may be determined by the matcher 1630. A current may flow in the MNG resonator 1600 via a connector, or may flow out from the MNG resonator 1600 via the connector. The connector may be connected to the ground conducting portion 1613 or the matcher 1630. The power may be transferred through coupling without using a physical connection between the connector and the ground conducting portion 1613 or the matcher 1630.

For example, as shown in FIG. 16, the matcher 1630 may be positioned within the loop formed by the loop structure of the resonator 1600. The matcher 1630 may adjust the impedance of the resonator 1600 by changing the physical shape of the matcher 1630. For example, the matcher 1630 may include a conductor 1631 for the impedance matching in a location separate from the ground conducting portion 1613 by a distance "h". The impedance of the resonator 1600 may be changed by adjusting the distance "h".

Although not illustrated in FIG. 16, a controller may be provided to control the matcher 1630. In one example, the matcher 1630 may change the physical shape of the matcher 1630 based on a control signal generated by the controller. For example, the distance "h" between the conductor 1631 of the matcher 1630 and the ground conducting portion 1613 may increase or decrease based on the control signal. Accordingly, the physical shape of the matcher 1630 may be changed such that the impedance of the resonator 1600 may be adjusted. The controller may generate the control signal based on various factors, which will be described later.

As shown in FIG. 16, the matcher 1630 may be configured as a passive element such as the conductor 1631. Depending on embodiments, the matcher 1630 may be configured as an active element, such as a diode, a transistor, and the like. When the active element is included in the matcher 1630, the active element may be driven based on the control signal generated by the controller, and the impedance of the resonator 1600 may be adjusted based on the control signal. For example, a diode that is a type of the active element may be included in the matcher 1630. The impedance of the resonator 1600 may be adjusted depending on whether the diode is in an on-state or in an off-state.

Although not illustrated in FIG. 16, a magnetic core may be further provided to pass through the MNG resonator 1600. The magnetic core may perform a function of increasing a power transmission distance.

Figure 17:
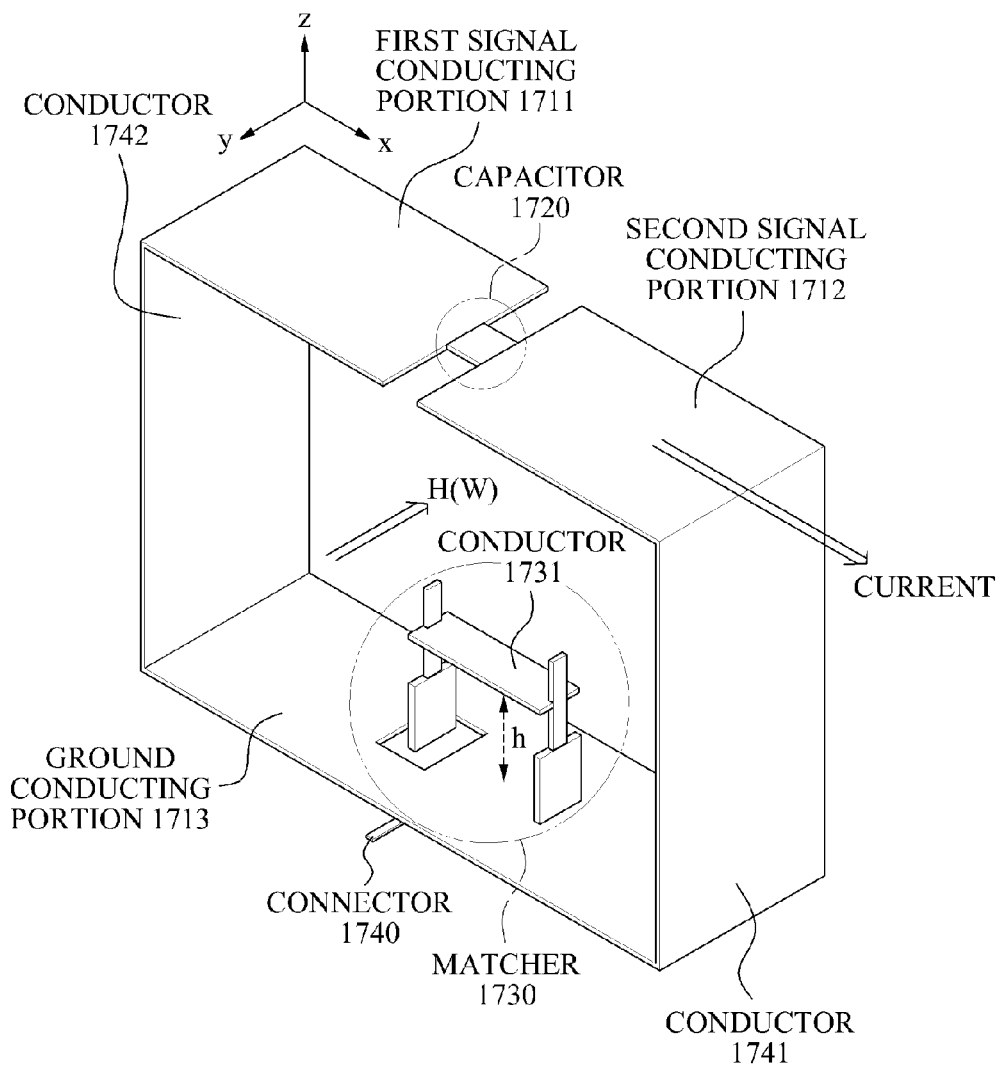

FIG. 17 illustrates an example of a resonator 1700 having a three-dimensional (3D) structure.

Referring to FIG. 17, the resonator 1700 having the 3D structure may include a transmission line and a capacitor 1720. The transmission line may include a first signal conducting portion 1711, a second signal conducting portion 1712, and a ground conducting portion 1713. The capacitor 1720 may be inserted in series between the first signal conducting portion 1711 and the second signal conducting portion 1712 of the transmission link, such that an electric field may be confined within the capacitor 1720.

As shown in FIG. 17, the resonator 1700 may have the 3D structure. The transmission line may include the first signal conducting portion 1711 and the second signal conducting portion 1712 in an upper portion of the resonator 1700, and may include the ground conducting portion 1713 in a lower portion of the resonator 1700. The first signal conducting portion 1711 and the second signal conducting portion 1712 may be disposed to face the ground conducting portion 1713. A current may flow in an "x" direction through the first signal conducting portion 1711 and the second signal conducting portion 1712. Due to the current, a magnetic field H(W) may be formed in a −y direction. Alternatively, unlike the diagram of FIG. 17, the magnetic field H(W) may be formed in a +y direction.

One end of the first signal conducting portion 1711 may be shorted (e.g., connected) to a conductor 1742, and another end of the first signal conducting portion 1711 may be connected to the capacitor 1720. One end of the second signal conducting portion 1712 may be grounded (e.g., connected) to a conductor 1741, and another end of the second signal conducting portion 1712 may be connected to the capacitor 1720. Accordingly, the first signal conducting portion 1711, the second signal conducting portion 1712, the ground conducting portion 1713, and the conductors 1741 and 1742 may be connected to each other, such that the resonator 1700 may have an electrically closed-loop structure. The term "loop structure" may include a polygonal structure, for example, a circular structure, a rectangular structure, and the like. "Having a loop structure" may indicate being electrically closed.

As shown in FIG. 17, the capacitor 1720 may be inserted between the first signal conducting portion 1711 and the second signal conducting portion 1712. The capacitor 1720 may be inserted into a space between the first signal conducting portion 1711 and the second signal conducting portion 1712. The capacitor 1720 may have a shape, for example, of a lumped element, a distributed element, and the like. As an example, a distributed capacitor having the shape of the distributed element may include zigzagged conductor lines and a dielectric material having a relatively high permittivity between the zigzagged conductor lines.

As the capacitor 1720 is inserted into the transmission line, the resonator 1700 may have a property of a metamaterial.

When a capacitance of the capacitor inserted as the lumped element is appropriately determined, the resonator 1700 may have a characteristic of a metamaterial. As the resonator 1700 may have a negative magnetic permeability by appropriately adjusting the capacitance of the capacitor 1720, the resonator 1700 may also be referred to as an MNG resonator. Various criteria may be applied to determine the capacitance of the capacitor 1720. For example, the various criteria may include a criterion for enabling the resonator 1700 to have the characteristic of the metamaterial, a criterion for enabling the resonator 1700 to have a negative magnetic permeability in a target frequency, a criterion enabling the resonator 1700 to have a zeroth order resonance characteristic in the target frequency, and the like. Based on at least one criterion among the aforementioned criteria, the capacitance of the capacitor 1720 may be determined.

The resonator 1700, also referred to as the MNG resonator 1700, may have a zeroth order resonance characteristic of having, as a resonance frequency, a frequency when a propagation constant is "0". As the resonator 1700 may have the zeroth order resonance characteristic, the resonance frequency may be independent with respect to a physical size of the MNG resonator 1700. By appropriately designing the capacitor 1720, the MNG resonator 1700 may sufficiently change the resonance frequency. Accordingly, the physical size of the MNG resonator 1700 may not be changed.

Referring to the MNG resonator 1700 of FIG. 17, in a near field, the electric field may be concentrated on the capacitor 1720 inserted into the transmission line. Accordingly, due to the capacitor 1720, the magnetic field may become dominant in the near field. For example, as the MNG resonator 1700 having the zeroth-order resonance characteristic may have characteristics similar to a magnetic dipole, the magnetic field may become dominant in the near field. A relatively small amount of the electric field formed due to the insertion of the capacitor 1720 may be concentrated on the capacitor 1720, and the magnetic field may become further dominant.

Also, the MNG resonator 1700 may include a matcher 1730 for impedance matching. The matcher 1730 may appropriately adjust the strength of magnetic field of the MNG resonator 1700. An impedance of the MNG resonator 1700 may be determined by the matcher 1730. A current may flow in the MNG resonator 1700 via a connector 1740, or may flow out from the MNG resonator 1700 via the connector 1740. The connector 1740 may be connected to the ground conducting portion 1713 or the matcher 1730.

In the example shown in FIG. 17, the matcher 1730 may be positioned within the loop formed by the loop structure of the resonator 1700. The matcher 1730 may adjust the impedance of the resonator 1700 by changing the physical shape of the matcher 1730. For example, the matcher 1730 may include a conductor 1731 for the impedance matching in a location separate from the ground conducting portion 1713 by a distance "h". The impedance of the resonator 1700 may be changed by adjusting the distance "h".

Although not illustrated in FIG. 17, a controller may be provided to control the matcher 1730. In one example, the matcher 1730 may change the physical shape of the matcher 1730 based on a control signal generated by the controller. For example, the distance "h" between the conductor 1731 of the matcher 1730 and the ground conducting portion 1713 may increase or decrease, based on the control signal. Accordingly, the physical shape of the matcher 1730 may be changed such that the impedance of the resonator 1700 may be adjusted. The distance "h" between the conductor 1731 of the matcher 1730 and the ground conducting portion 1713 may be adjusted using a variety of schemes. As one example, a plurality of conductors may be included in the matcher 1730 and the distance "h" may be adjusted by adaptively activating one of the conductors. As another example, the distance "h" may be adjusted by adjusting the physical location of the conductor 1731 up and down. The distance "h" may be controlled based on the control signal of the controller. The controller may generate the control signal using various factors. An example of the controller generating the control signal will be described later.

As shown in FIG. 17, the matcher 1730 may be configured as a passive element, such as the conductor 1731. Depending on embodiments, the matcher 1730 may be configured as an active element, such as a diode, a transistor, and the like. When the active element is included in the matcher 1730, the active element may be driven based on the control signal generated by the controller, and the impedance of the resonator 1700 may be adjusted based on the control signal. For example, a diode that is a type of the active element may be included in the matcher 1730. The impedance of the resonator 1700 may be adjusted depending on whether the diode is in an on-state or in an off-state.

Although not illustrated in FIG. 17, a magnetic core may be further provided to pass through the resonator 1700 configured as the MNG resonator. The magnetic core may perform a function of increasing a power transmission distance.

Figure 18:
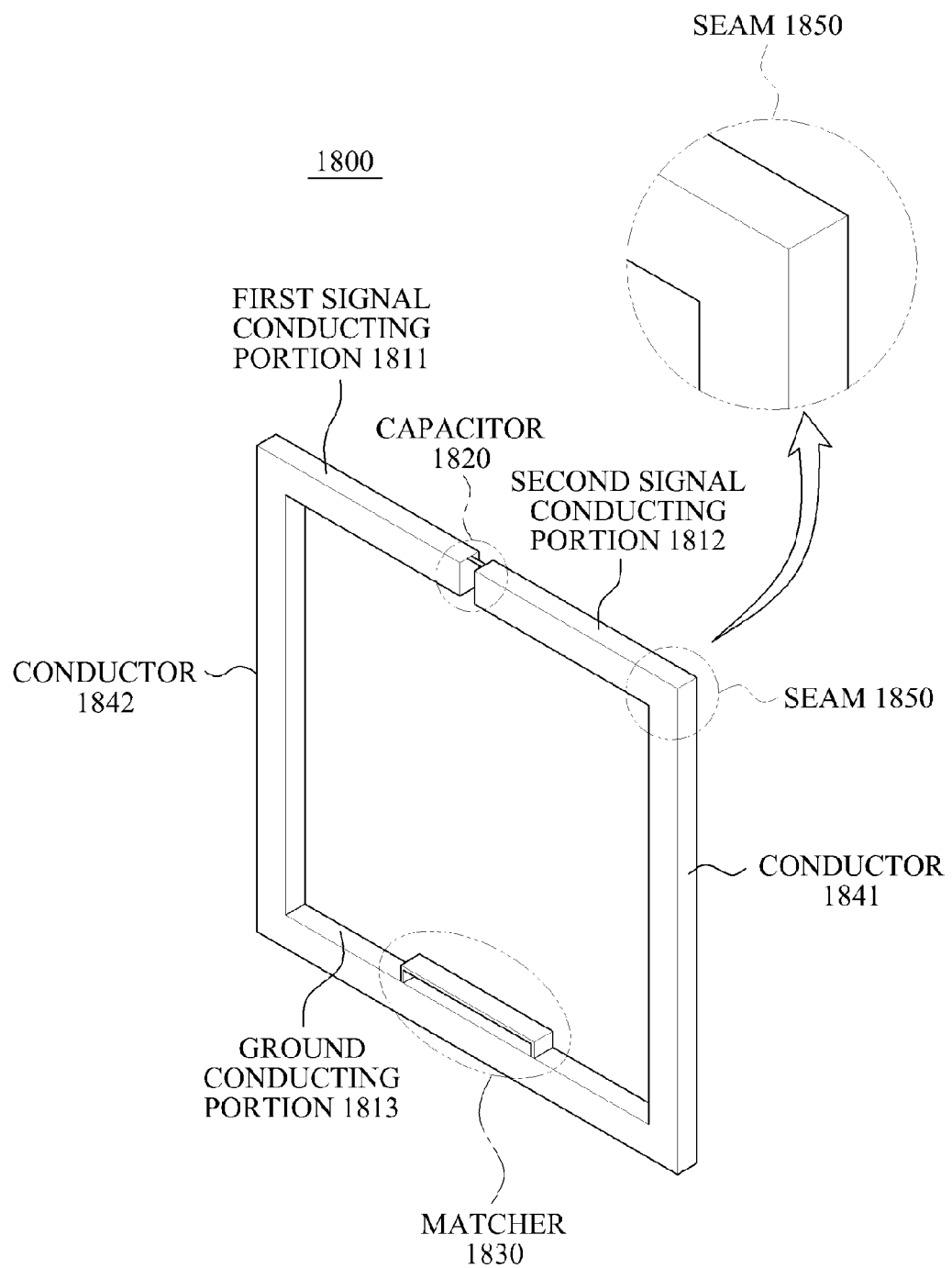

FIG. 18 illustrates an example of a resonator 1800 for a wireless power transmission configured as a bulky type.

Referring to FIG. 18, a first signal conducting portion 1811 and a second signal conducting portion 1812 may be integrally formed, instead of being separately manufactured, and may be connected to each other. Similarly, the second signal conducting portion 1812 and a conductor 1841 may also be integrally manufactured.

When the second signal conducting portion 1812 and the conductor 1841 are separately manufactured and then are connected to each other, a loss of conduction may occur due to a seam 1850. The second signal conducting portion 1812 and the conductor 1841 may be connected to each other without using a separate seam, that is, may be seamlessly connected to each other. Accordingly, it is possible to decrease a conductor loss caused by the seam 1850. Accordingly, the second signal conducting portion 1812 and a ground conducting portion 1831 may be seamlessly and integrally manufactured. Similarly, the first signal conducting portion 1811 and the ground conducting portion 1831 may be seamlessly and integrally manufactured.

Referring to FIG. 18, a type of a seamless connection connecting at least two partitions into an integrated form is referred to as a "bulky type."

Figure 19:
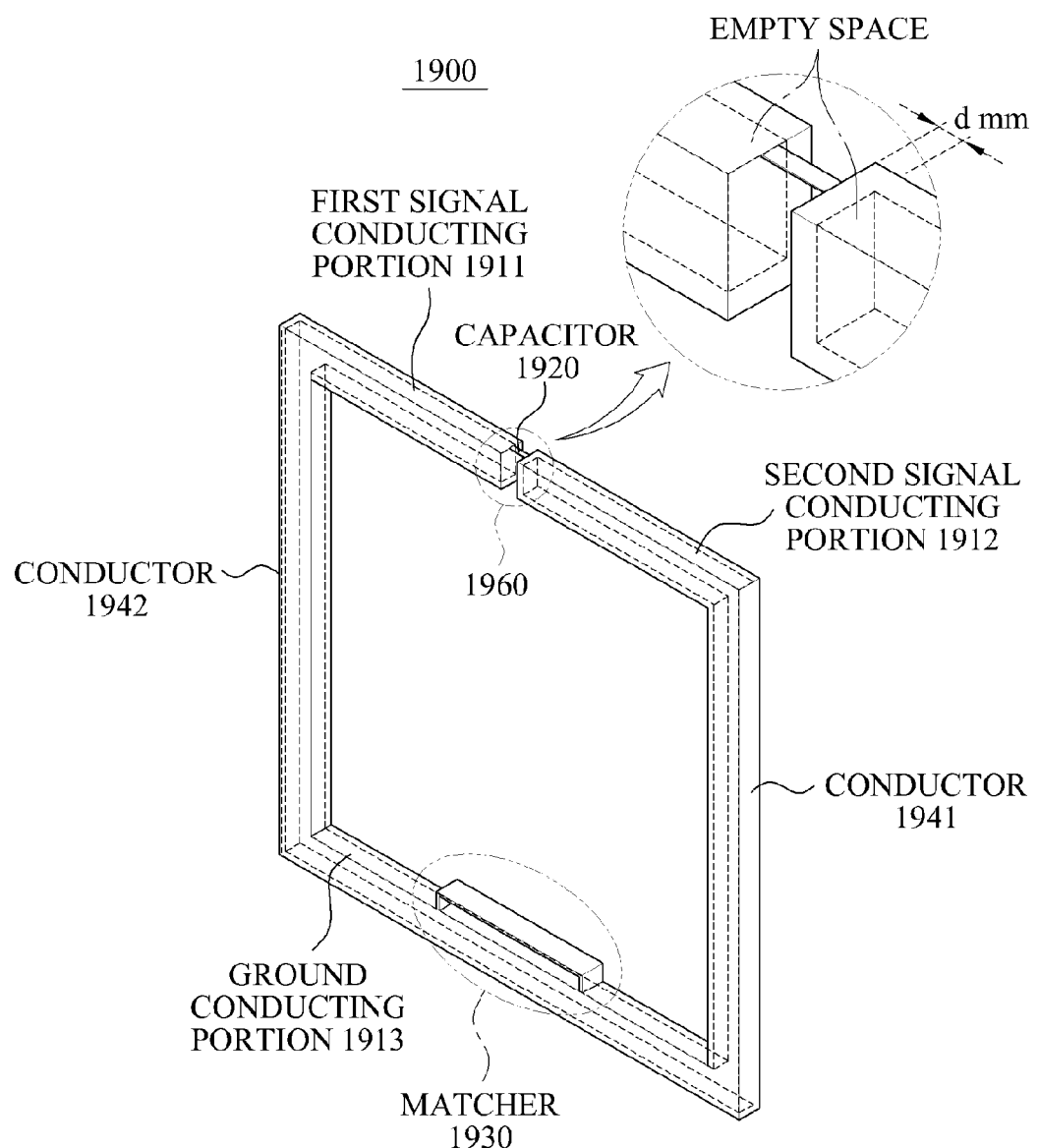

FIG. 19 illustrates an example of a resonator 1900 for a wireless power transmission, configured as a hollow type.

Referring to FIG. 19, each of a first signal conducting portion 1911, a second signal conducting portion 1912, a ground conducting portion 1913, and conductors 1941 and 1942 of the resonator 1900, configured as the hollow type, may include an empty space inside.

In a given resonance frequency, an active current may be modeled to flow in only a portion of the first signal conducting portion 1911, instead of all of the first signal conducting portion 1911; a portion of the second signal conducting portion 1912, instead of all of the second signal conducting portion 1912; a portion of the ground conducting portion 1913, instead of all of the ground conducting portion 1913; and a portion of the conductors 1941 and 1942, instead of all of the conductors 1941 and 1942. For example, when a depth of each of the first signal conducting portion 1911, the second signal conducting portion 1912, the ground conducting portion 1913, and the conductors 1941 and 1942 is significantly deeper than a corresponding skin depth in the given resonance frequency, it may be less effective. The significantly deeper depth may increase a weight or manufacturing costs of the resonator 1900.

Accordingly, in the given resonance frequency, the depth of each of the first signal conducting portion 1911, the second signal conducting portion 1912, the ground conducting portion 1913, and the conductors 1941 and 1942 may be appropriately determined, based on the corresponding skin depth of each of the first signal conducting portion 1911, the second signal conducting portion 1912, the ground conducting portion 1913, and the conductors 1941 and 1942. When each of the first signal conducting portion 1911, the second signal conducting portion 1912, the ground conducting portion 1913, and the conductors 1941 and 1942 has an appropriate depth deeper than a corresponding skin depth, the resonator 1900 may become more lightweight, and manufacturing costs of the resonator 1900 may also decrease.

For example, as shown in FIG. 19, the depth of the second signal conducting portion 1912 may be determined as "d" mm, and "d" may be determined according to $$d = \frac{1}{\sqrt{\pi f \mu \sigma}}.$$

Here, f denotes a frequency, μ denotes a magnetic permeability, and σ denotes a conductor constant. When the first signal conducting portion 1911, the second signal conducting portion 1912, the ground conducting portion 1913, and the conductors 1941 and 1942 are made of a copper and have a conductivity of $5.8 \times 10^7$ siemens per meter (S·m$^{-1}$), the skin depth may be about 0.6 mm with respect to 10 kHz of the resonance frequency and the skin depth may be about 0.006 mm with respect to 100 MHz of the resonance frequency.

Figure 20:
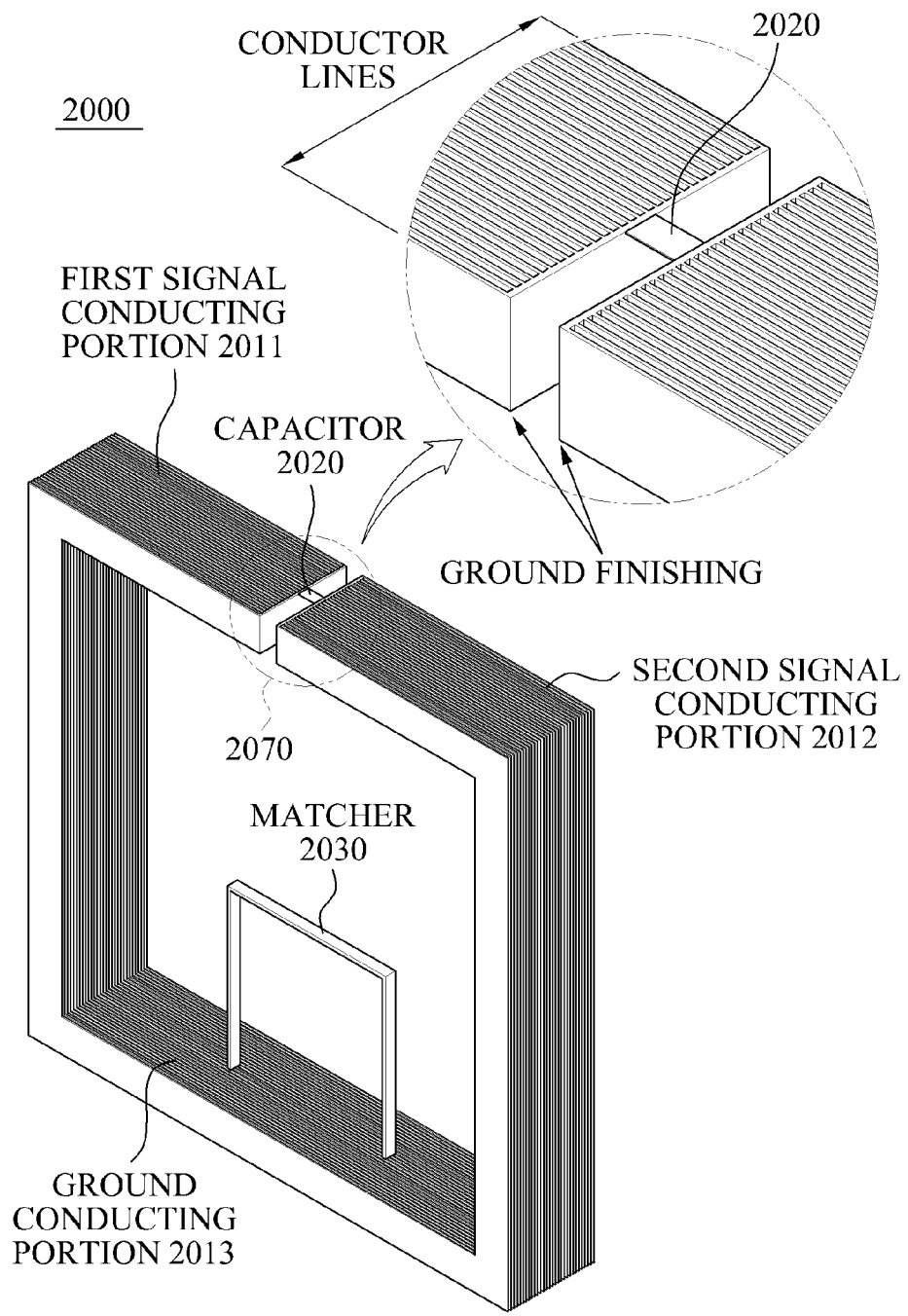

FIG. 20 illustrates an example of a resonator 2000 for a wireless power transmission using a parallel-sheet.

Referring to FIG. 20, the parallel-sheet may be applicable to each of a first signal conducting portion 2011 and a second signal conducting portion 2012 included in the resonator 2000.

Each of the first signal conducting portion 2011 and the second signal conducting portion 2012 may not be a perfect conductor, thus, they may have a resistance. Due to the resistance, an ohmic loss may occur. The ohmic loss may decrease a Q-factor and may also decrease a coupling effect.

By applying the parallel-sheet to each of the first signal conducting portion 2011 and the second signal conducting portion 2012, it may be possible to decrease the ohmic loss, and to increase the Q-factor and the coupling effect. Referring to a portion 2070 indicated by a dashed circle, when the parallel-sheet is applied, each of the first signal conducting portion 2011 and the second signal conducting portion 2012 may include a plurality of conductor lines. The plurality of conductor lines may be disposed in parallel, and may be shorted at an end portion of each of the first signal conducting portion 2011 and the second signal conducting portion 2012.

As described above, when the parallel-sheet is applied to each of the first signal conducting portion 2011 and the second signal conducting portion 2012, the plurality of conductor lines may be disposed in parallel. Accordingly, a sum of resistances having the conductor lines may decrease. Consequently, the resistance loss may decrease, and the Q-factor and the coupling effect may increase.

FIG. 21 illustrates an example of a resonator 2100 for a wireless power transmission, including a distributed capacitor.

Referring to FIG. 21, a capacitor 2120 included in the resonator 2100 for the wireless power transmission may be a distributed capacitor. A capacitor as a lumped element may have a relatively high equivalent series resistance (ESR). A variety of schemes have been proposed to decrease the ESR contained in the capacitor of the lumped element. According to an embodiment, by using the capacitor 2120 as a distributed element, it may be possible to decrease the ESR. As is known in the art, a loss caused by the ESR may decrease a Q-factor and a coupling effect.

As shown in FIG. 21, the capacitor 2120 as the distributed element may have a zigzagged structure. For example, the capacitor 2120 as the distributed element may be configured as a conductive line and a conductor having the zigzagged structure.

As shown in FIG. 21, by employing the capacitor 2120 as the distributed element, it may be possible to decrease the loss occurring due to the ESR. In addition, by disposing a plurality of capacitors as lumped elements, it may be possible to decrease the loss occurring due to the ESR. As a resistance of each of the capacitors as the lumped elements may decrease through a parallel connection, active resistances of parallel-connected capacitors as the lumped elements may also decrease, such that the loss occurring due to the ESR may decrease. For example, by employing ten capacitors of 1 pF instead of using a single capacitor of 10 pF, it may be possible to decrease the loss occurring due to the ESR.

Figure 22A:
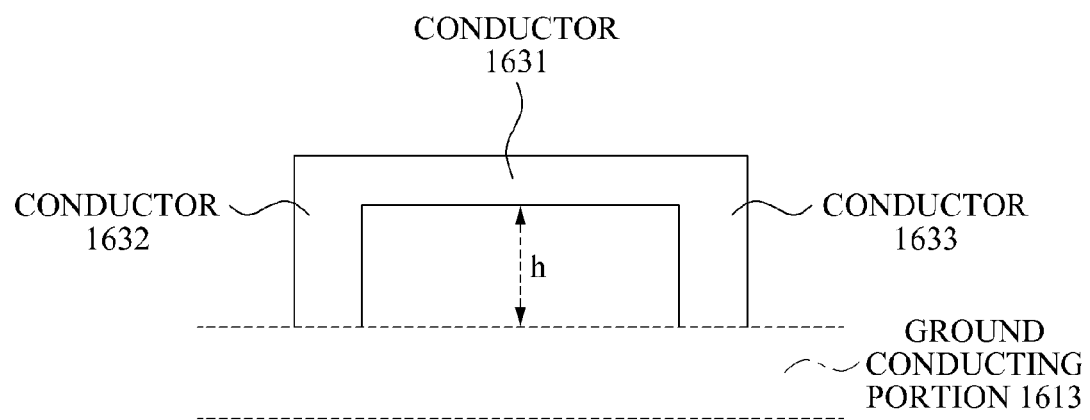
Figure 22B:
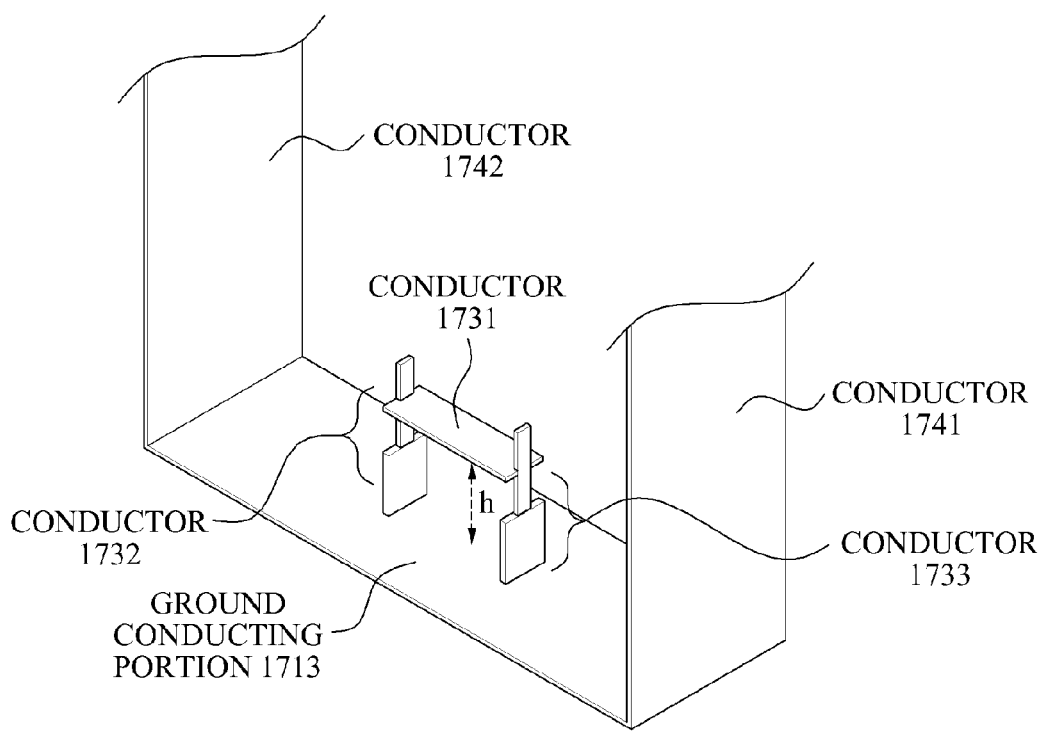

FIG. 22A illustrates an example of the matcher 1630 used in the resonator 1600 provided in the 2D structure of FIG. 16. FIG. 22B illustrates an example of the matcher 1730 used in the resonator 1700 provided in the 3D structure of FIG. 17.

Specifically, FIG. 22A illustrates a portion of the 2D resonator including the matcher 1630, and FIG. 22B illustrates a portion of the 3D resonator of FIG. 17 including the matcher 1730.

Referring to FIG. 22A, the matcher 1630 may include the conductor 1631, a conductor 1632, and a conductor 1633. The conductors 1632 and 1633 may each be connected to the ground conducting portion 1613 and the conductor 1631. The impedance of the 2D resonator may be determined based on a distance "h" between the conductor 1631 and the ground conducting portion 1613. The distance "h" between the conductor 1631 and the ground conducting portion 1613 may be controlled by the controller. The distance "h" between the conductor 1631 and the ground conducting portion 1613 may be adjusted using a variety of schemes. For example, the variety of schemes may include a scheme of adjusting the distance "h" by adaptively activating one or more of the conductors 1631, 1632, and 1633, a scheme of adjusting the physical location of the conductor 1631 up and down, and the like.

Referring to FIG. 22B, the matcher 1730 may include the conductor 1731, a conductor 1732, and a conductor 1733. The conductors 1732 and 1733 may be connected to the ground conducting portion 1713 and the conductor 1731. The conductors 1732 and 1733 may be connected to the ground conducting portion 1713 and the conductor 1731. The impedance of the 3D resonator may be determined based on a distance "h" between the conductor 1731 and the ground conducting portion 1713. The distance "h" between the conductor 1731 and the ground conducting portion 1713 may be controlled by the controller. Similarly to the matcher 1630 included in the 2D structured resonator, in the matcher 1730 included in the 3D structured resonator, the distance "h" between the conductor 1731 and the ground conducting portion 1713 may be adjusted using a variety of schemes. For example, the variety of schemes may include a scheme of adjusting the distance "h" by adaptively activating one or more of the conductors 1731, 1732, and 1733, a scheme of adjusting the physical location of the conductor 1731 up and down, and the like.

Although not illustrated in FIGS. 22A and 22B, the matcher may include an active element. A scheme of adjusting an impedance of a resonator using the active element may be similar to that described above. For example, the impedance of the resonator may be adjusted by changing a path of a current flowing through the matcher using the active element.

Figure 23:
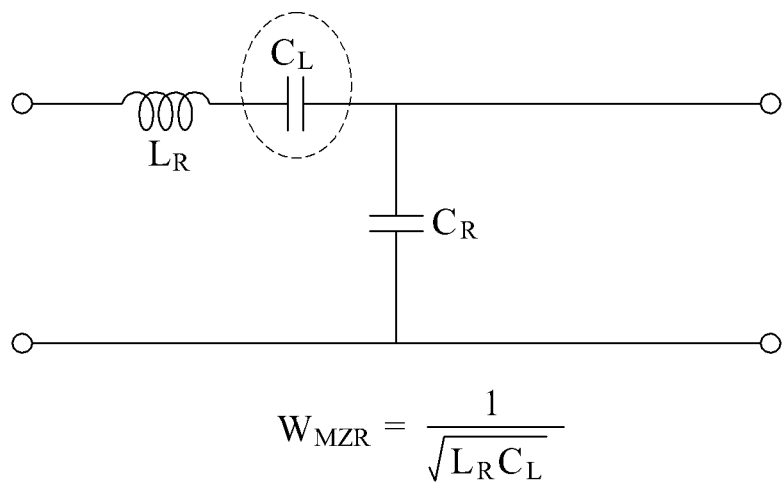
FIG. 23 is a diagram illustrating an equivalent circuit of the resonator of FIG. 16.

FIG. 23 illustrates an example of an equivalent circuit of the resonator 1600 for the wireless power transmission of FIG. 16.

The resonator 1600 for the wireless power transmission may be modeled to the equivalent circuit of FIG. 23. In the equivalent circuit of FIG. 23, $C_L$ denotes a capacitor that is inserted, e.g., in a form of a lumped element, in the middle of the transmission line of FIG. 16.

The resonator 1600 may have a zeroth resonance characteristic. For example, when a propagation constant is "0", the resonator 1600 may be presumed to have $\omega_{MZR}$ as a resonance frequency. The resonance frequency $\omega_{MZR}$ may be expressed according to Equation 1.

$$\omega_{MZR} = \frac{1}{\sqrt{L_R C_L}} \quad \text{[Equation 1]}$$

In Equation 1, MZR denotes a Mu (μ) zero resonator.

Referring to Equation 1, the resonance frequency $\omega_{MZR}$ of the resonator 1600 may be determined by $L_R/C_L$. A physical size of the resonator 1600 and the resonance frequency $\omega_{MZR}$ may be independent with respect to each other. As the physical sizes are independent with respect to each other, the physical size of the resonator 1600 may be sufficiently reduced.

As a non-exhaustive illustration only, the devices described herein may be incorporated in or used in conjunction with mobile devices such as a cellular phone, a personal digital assistant (PDA), a digital camera, a portable game console, and an MP3 player, a portable/personal multimedia player (PMP), a handheld e-book, a portable tablet and/or laptop computer, a global positioning system (GPS) navigation, and devices such as a desktop PC, a high definition television (HDTV), an optical disc player, a setup and/or set top box, and the like, consistent with that disclosed herein. For example, the resonance power receiving apparatus may be any device that requires a power source, e.g., a battery, to be charged, and is not limited to the above-described example of a laptop computer.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmission system, the system comprising:
   a set-up box comprising a source resonance unit configured to transmit a resonance power to a resonance power receiving apparatus;
   the resonance power receiving apparatus, comprising a target resonance unit configured to receive the resonance power; and
   a shielding unit configured to focus, on the target resonance unit, a magnetic field emitted in an omni-direction by the source resonance unit.

2. The system of claim 1, wherein the source resonance unit is included in a top of the set-up box, the source resonance unit comprising a source resonator and a shielding film configured to prevent current offsetting between the source resonator and a substrate.

3. The system of claim 2, wherein the source resonance unit comprises:
   a transmission line unit comprising multiple transmission line sheets arranged in parallel; and
   a capacitor configured to be inserted in a predetermined location of the transmission line unit.

4. The system of claim 1, wherein the target resonance unit is included in a bottom of the resonance power receiving apparatus, the target resonance unit configured to operate with a same resonance frequency as the source resonance unit.

5. The system of claim 4, wherein the target resonance unit comprises:
   a transmission line unit comprising multiple transmission line sheets arranged in parallel; and
   a capacitor configured to be inserted in a predetermined location of the transmission line unit.

6. The system of claim 1, wherein the shielding unit comprises:
a metal housing; and
a near-field focusing unit included in the metal housing, the near-field focusing unit comprising a high impedance surface (HIS).

7. The system of claim 6, wherein the near-field focusing unit is configured to enable a magnetic field of the source resonance unit to be in-phase.

8. The system of claim 6, wherein the near-field focusing unit comprises first and second side focusing units to control a direction of magnetic fields emitted to the sides of the source resonance unit, a rear focusing unit to control a direction of magnetic fields emitted to the rear of the source resonance unit, and a supporting unit to support the source resonance unit.

9. The system of claim 1, wherein the source resonance unit is further configured to transmit the resonance power, based on a resonance frequency in a band of 2 MHz to 20 MHz.

10. The system of claim 1, wherein the source resonance unit and the target resonance unit are further configured to:
perform communication, based on a frequency in a band of 2 MHz to 20 MHz; and
perform transmission and reception of data at less than or equal to 1 Mbps.

11. The system of claim 1, wherein the source resonance unit and the target resonance unit are further configured to transmit and receive data to:
authenticate an ID of the resonance power receiving apparatus; and
check a charge level.

12. The system of claim 1, wherein:
the source resonance unit is further configured to sense multiple resonance power receiving apparatuses to be charged; and
each of the multiple resonance power receiving apparatuses to be charged is further configured to receive the resonance power from the source resonance unit through magnetic-coupling.

13. The system of claim 1, wherein the resonance power receiving apparatus comprises a laptop computer.

14. A method for a wireless power transmission system, the method comprising:
transmitting, by a source resonance unit in a set-up box, a resonance power to a resonance power receiving apparatus;
receiving, by a target resonance unit in the resonance power receiving apparatus, the resonance power; and
focusing on the target resonance unit, by a shielding unit, a magnetic field emitted in an omni-direction by the source resonance unit.

15. The method of claim 14, further comprising:
preventing, by the source resonance unit comprising a source resonator and a shielding film, current offsetting between the source resonator and a substrate,
wherein the source resonance unit is included in a top of the set-up box.

16. The method of claim 14, further comprising:
operating the target resonance unit with a same resonance frequency as the source resonance unit,
wherein the target resonance unit is included in a bottom of the set-up box.

17. The method of claim 14, wherein the shielding unit comprises:
a metal housing; and
a near-field focusing unit included in the metal housing, the near-field focusing unit comprising a high impedance surface (HIS).

18. The method of claim 17, further comprising enabling, by the near-field focusing unit, a magnetic field of the source resonance unit to be in-phase.

19. The method of claim 14, further comprising transmitting the resonance power, by the source resonance unit, based on a resonance frequency in a band of 2 MHz to 20 MHz.

20. The method of claim 14, further comprising:
performing, by the source resonance unit and the target resonance unit, communication, based on a frequency in a band of 2 MHz to 20 MHz; and
performing, by the source resonance unit and the target resonance unit, transmission and reception of data at less than or equal to 1 Mbps.

21. The method of claim 14, further comprising:
transmitting and receiving data, by the source resonance unit and the target resonance unit, to:
authenticate an ID of the resonance power receiving apparatus; and
check a charge level.

22. The method of claim 14, further comprising:
sensing, by the source resonance unit, multiple resonance power receiving apparatuses to be charged; and
receiving, by each of the multiple resonance power receiving apparatuses to be charged, the resonance power from the source resonance unit through magnetic-coupling.

23. The system of claim 14, wherein the resonance power receiving apparatus comprises a laptop computer.

24. A resonance device for a wireless power transmission system, the resonance device comprising:
a transmission line comprising:
a first signal conducting portion;
a second signal conducting portion;
and a ground conducting portion;
a capacitor configured to be inserted in a predetermined location of the transmission line;
first and second conductors respectively electrically connected to the a first and second signal conducting portions; and
a matcher electrically connected to the ground conducting portion, the matcher comprising a third conductor.

25. The resonance device of claim 24, wherein the transmission line unit further comprises multiple transmission line sheets arranged in parallel.

26. The resonance device of claim 24, further comprising a connector configured to receive or transmit a current.

27. A wireless power unit, the wireless power unit comprising: resonance device comprising:
a transmission line comprising:
a first signal conducting portion;
a second signal conducting portion; and
a ground conducting portion;
a capacitor configured to be inserted in a predetermined location of the transmission line;
first and second conductors respectively electrically connected to the a first and second signal conducting portions; and
a matcher electrically connected to the ground conducting portion, the matcher comprising a third conductor.

28. The wireless power unit of claim 27, wherein the transmission line unit further comprises multiple transmission line sheets arranged in parallel.

29. The wireless power unit of claim 27, further comprising a connector configured to receive or transmit a current.

30. The wireless power unit of claim 27, wherein the wireless power unit comprises one or more of: a cellular phone, a personal digital assistant (PDA), a digital camera, a portable game console, and an MP3 player, a portable/personal multimedia player (PMP), a handheld e-book, a portable tablet and/or laptop computer, a global positioning system (GPS) navigation.

31. A wireless power system, the system comprising:
a set-up box comprising a source resonance unit configured to transmit a resonance power to a resonance power receiving apparatus; and
a shielding unit configured to focus, on a target resonance unit, a magnetic field emitted in an omni-direction by the source resonance unit.

32. The system of claim 31, wherein the source resonance unit is included in a top of the set-up box, the source resonance unit comprising a source resonator and a shielding film configured to prevent current offsetting between the source resonator and a substrate.

33. The system of claim 32, wherein the source resonance unit comprises:
a transmission line unit comprising multiple transmission line sheets arranged in parallel; and
a capacitor configured to be inserted in a predetermined location of the transmission line unit.

34. The system of claim 31, wherein the shielding unit comprises:
a metal housing; and
a near-field focusing unit included in the metal housing, the near-field focusing unit comprising a high impedance surface (HIS).

35. The system of claim 34, wherein the near-field focusing unit is configured to enable a magnetic field of the source resonance unit to be in-phase.

36. The system of claim 31, wherein the source resonance unit is further configured to transmit the resonance power, based on a resonance frequency in a band of 2 MHz to 20 MHz.

37. The system of claim 31, wherein the source resonance unit is further configured to:
perform communication, based on a frequency in a band of 2 MHz to 20 MHz; and
perform transmission of data at less than or equal to 1 Mbps.

38. The system of claim 31, wherein the source resonance unit is further configured to transmit and receive data to:
authenticate an ID of the resonance power receiving apparatus; and
check a charge level.

39. The system of claim 31, wherein:
the source resonance unit is further configured to sense multiple resonance power receiving apparatuses to be charged; and
resonance power is transmitted from the source resonance unit through magnetic-coupling.

40. A wireless power system, the system comprising:
a resonance power receiving apparatus including a target resonance unit, the target resonance unit comprising:
a transmission line unit comprising multiple transmission line sheets arranged in parallel; and
a capacitor configured to be inserted in a predetermined location of the transmission line unit,
the target resonance unit being configured to receive a resonance power from a source resonance unit and operate with a same resonance frequency as the source resonance unit, wherein the target resonance unit is included in a bottom of the resonance power receiving apparatus.

41. The system of claim 40, wherein the target resonance unit is further configured to:
perform communication, based on a frequency in a band of 2 MHz to 20 MHz; and
perform transmission and reception of data at less than or equal to 1 Mbps.

42. The system of claim 40, wherein the target resonance unit is further configured to transmit and receive data to:
authenticate an ID of the resonance power receiving apparatus; and
check a charge level.

43. The system of claim 40, further comprising:
a plurality of resonance power receiving apparatuses to be charged,
wherein each of the plurality of resonance power receiving apparatuses to be charged is further configured to receive the resonance power from the source resonance unit through magnetic-coupling.

\* \* \* \* \*